(12) United States Patent
Rao et al.

(10) Patent No.: US 9,638,803 B2
(45) Date of Patent: May 2, 2017

(54) NAVIGATION DATA CONFIGURATION FOR OPTIMAL TIME TO FIRST FIX

(71) Applicant: Accord Software & Systems Pvt. Ltd., Bangalore (IN)

(72) Inventors: Vyasaraj Guru Rao, Bangalore (IN); Sashidharan Maa, Bangalore (IN); Ge'rard Lachapelle, Calgary (CA)

(73) Assignee: Accord Software & Systems Pvt. Ltd., Bangalore, Karnataka (IN)

( * ) Notice: Subject to any disclaimer, the term of this patent is extended or adjusted under 35 U.S.C. 154(b) by 779 days.

(21) Appl. No.: 14/018,443

(22) Filed: Sep. 5, 2013

(65) Prior Publication Data

US 2014/0327575 A1 Nov. 6, 2014

(30) Foreign Application Priority Data

May 6, 2013 (IN) .......................... 2011/CHE/2013

(51) Int. Cl.
*G01S 19/24* (2010.01)
*G01S 19/05* (2010.01)

(52) U.S. Cl.
CPC .................................. *G01S 19/05* (2013.01)

(58) Field of Classification Search
CPC ....................................................... G01S 19/05
USPC .................................................... 342/357.63
See application file for complete search history.

(56) References Cited

U.S. PATENT DOCUMENTS

| | | | |
|---|---|---|---|
| 6,473,030 B1 | 10/2002 | McBurney et al. | |
| 6,651,000 B2 * | 11/2003 | van Diggelen | ......... G01S 19/05 342/352 |
| 6,670,915 B1 | 12/2003 | McBurney et al. | |
| 6,775,802 B2 * | 8/2004 | Gaal | ...................... G01S 19/246 342/357.64 |
| 7,786,932 B2 | 8/2010 | Syed et al. | |
| 8,009,091 B2 | 8/2011 | Tsai | |

(Continued)

OTHER PUBLICATIONS

Rao et al., "Proposed LOS Signal Design for IRNSS to Reduce TTFF in a Single Frequency Receiver", GNSS Signals 2011, Dec. 8-9, 2011.*

(Continued)

*Primary Examiner* — Frank J McGue
(74) *Attorney, Agent, or Firm* — Ash Tankha; Lipton, Weinberger & Husick

(57) ABSTRACT

A method and a system for reducing time to first fix (TTFF) in a satellite navigation receiver generate a navigation data structure including three sub-frames. A first sub-frame and a second sub-frame accommodate selective ephemeris data. The third sub-frame accommodates a text message including almanac data optionally, ionospheric data, coordinated universal time (UTC) data, textual data optionally, and any combination thereof. A signal generation system (SGS) in the system selectively groups the almanac data, the ionospheric data, and the UTC data, and selectively transmits the navigation data with the almanac data or free of the almanac data in the navigation data structure to the satellite navigation receiver. The signal generation system also staggers the navigation data in each sub-frame into a first portion and a second portion for parallelly transmitting the navigation data over a first carrier frequency and a second carrier frequency in reduced time.

21 Claims, 17 Drawing Sheets

(56) References Cited

U.S. PATENT DOCUMENTS

2007/0132635 A1  6/2007  Dockemeyer, Jr. et al.
2010/0045527 A1  2/2010  Li et al.

OTHER PUBLICATIONS

Rao et al., "New Method of Cross Correlation Detection in IRNSS and Civil Aviation Receivers", NAVCOM 2012, Dec. 20-21, 2012.*
Rao et al., "Proposed Dual Frequency Signal Design for Optimal TTFF in IRNSS", NAVCOM 2012, Dec. 20-21, 2012.*

* cited by examiner

| MESSAGE TYPE | DESCRIPTION | SATELLITE ID | RATE (S) |
|---|---|---|---|
| 00 | RESERVED | -- | --- |
| 01 | ALMANAC-IONO | IN ALL SATELLITES STAGGERED | $(T0 + 18) * N^+$, WHERE $N = 1, 3 \ldots 33599$ |
| 02 | ALMANAC-UTC | IN ALL SATELLITES STAGGERED | $(T0 + 18) * N$, WHERE $N = 1, 3 \ldots 33599$ |
| 03 | IONO-UTC | ONE SATELLITE, STAGGERED | $(T0 + 18) * N$, WHERE $N = 2, 4 \ldots 33600$ |
| 04 – 63 | ANY USER DATA | SATELLITES, STAGGERED (CYCLIC) | $(T0 + 18) * N$, WHERE $N = 2, 4 \ldots 33600$ |

FIG. 4

| PARAMETER | TSN | TSF |
|---|---|---|
| ASSUMPTION | NONE | SECONDARY PARAMETERS ARE RESTRICTED TO UTC AND IONOSPHERIC TERMS ONLY |
| $T_{EPH}$/TTFF | 40% IMPROVEMENT | 60% IMPROVEMENT |
| $T_{TEXTUAL}$/$T_{ALM}$ | 82% IMPROVEMENT | NOT APPLICABLE |
| GLOBAL EXTENSION OF IRNSS | POSSIBLE | POSSIBLE |

FIG. 14

| MODE OF OPERATION | SPS (s) | RESTRICTED (s) | DESCRIPTION |
|---|---|---|---|
| SINGLE | 12 | 12 | THE TRANSMISSION OF PRIMARY PARAMETERS IS OPTIMAL FROM EITHER THE L5 OR S1 PATH FOR A SPS USER, WHICH IS THE TTFF OF RESTRICTED USERS (ASSUMING THE DATA OF SPS AND RESTRICTED ARE THE SAME) |
| DUAL | 6 | 6 | THE DATA FROM THE L5/S1 PATHS EFFECTIVELY ENABLE THE SPS RECEIVER TO ACHIEVE THE MOST OPTIMAL TTFF. WITH TOW, THE RESTRICTED SERVICE ENTERS INTO MEASUREMENT MODE AND PROVIDES INSTANTANEOUS POSITIONING (WITH NAV DATA FROM SPS PATH) |

FIG. 15

| MODE OF OPERATION | SPS (s) | RESTRICTED (s) | DESCRIPTION/REMARKS |
|---|---|---|---|
| SINGLE | 12 | 18 | THE TRANSMISSION OF THE PRIMARY NAVIGATION DATA PARAMETERS IS IDENTICAL AND THUS TTFF FROM EITHER L5 OR S1 REMAINS THE SAME.<br><br>WITH DATA BEING DIFFERENT, THE CODE DIVERSITY IS NOT APPLICABLE AND THUS WITH SPS ASSISTANCE, THE TTFF FOLLOWS RESTRICTED USERS IN A SINGLE FREQUENCY MODE. |
| DUAL | 9 | 9 | IN THE CIVILIAN MODE OF OPERATION, THE NAVIGATION DATA FROM L5 AND S1 WHEN PROCESSED EFFECTIVELY RESULTS IN A TTFF OF 9s.<br><br>WITH HOW AVAILABLE IN 3s (STRADDLING OF THE SPS SUB-FRAMES), THE TTFF OF THE RESTRICTED USERS IN THE SPS ASSISTED MODE WITH DIFFERENT DATA IS 9s. |

FIG. 16

NAVIGATION DATA CONFIGURATION FOR OPTIMAL TIME TO FIRST FIX

CROSS REFERENCE TO RELATED APPLICATIONS

This application claims the benefit of the following patent applications:
1. Non-provisional patent application number 2011/CHE/2013 titled "Navigation Data Configuration For Optimal Time To First Fix", filed in the Indian Patent Office on May 6, 2013.
2. Non-provisional patent application number 4231/CHE/2011 titled "Navigation Data Structure Generation and Data Transmission For Optimal Time To First Fix", filed on 5 Dec. 2011 in the Indian Patent Office.
3. Non-provisional patent application number 4230/CHE/2011 titled "Satellite Navigation System For Optimal Time To First Fix Using Code And Carrier Diversity", filed on 5 Dec. 2011 in the Indian Patent Office.

The specifications of the above referenced patent applications are incorporated herein by reference in their entirety.

BACKGROUND

Autonomous regional satellite based navigation systems have enabled several countries to cover their territorial footprint and the footprint of their surrounding areas. A regional satellite based navigation system such as a global navigation satellite system (GNSS) caters to the needs of specific users, for example, military personnel for military applications, and civilian users for civilian applications. For example, India is planning to deploy an autonomous regional satellite navigation system, namely, the Indian regional navigational satellite system (IRNSS), for surveying, telecommunication, transportation, identifying disaster locations, public safety, etc. The purpose of this navigation system is to cater to the needs of both standard positioning service (SPS) users and also to the needs of restricted service (RES) users. The SPS and the RES modes of service are dual services supported by any GNSS catering to civilian and military requirements exclusively. A military signal is generally acquired in two modes, namely, direct and indirect. The indirect mode is typically known as SPS assisted. There is a need for generating navigation data structures that address the needs of the SPS and RES modes of service. Specifically, for the RES signal, there is a need for the navigation data structure to account for the direct mode of acquisition or the SPS assisted mode. In the SPS assisted mode, with assistance from time of week (TOW) data, the jump on to the RES signal is established. The IRNSS will deploy a satellite constellation comprising seven satellites, three of which will be in geostationary orbits and four in geosynchronous orbits. The signals will be transmitted by the satellites in two frequency bands, namely, L5 frequency band (1176.45 megahertz (MHz)) and S1 frequency band (2492.08 MHz). The SPS signal will be modulated by a 1 MHz binary phase shift keying (BPSK) signal, whereas the PS signal will use a binary offset carrier, BOC (5, 2).

A number of issues need to be addressed while designing a satellite navigation system, for example, sensitivity improvements, jamming margins, robustness towards spoofing, multipath related improvements, time to first fix (TTFF), etc., for ensuring the efficiency and robustness of the satellite navigation system. Time to first fix (TTFF) is an important parameter that needs to be optimized in most satellite navigation receivers. TTFF is a measure of the time taken by a satellite navigation receiver to acquire satellite signals and navigation data, and output a first position solution, referred to as a "fix", from power-on. The TTFF parameter directly influences the efficiency of position tracking by the satellite navigation receiver. The TTFF parameter has been examined at length and several approaches have been proposed to reduce this parameter. However, most of the approaches have concentrated on augmenting the satellite navigation receiver with data aid to the satellite navigation receiver. For an optimal TTFF performance, it is necessary that the time taken for computing navigation measurements and collecting subsequent navigation data is minimal. Typically, methods for reducing TTFF have focused on reducing the time required to acquire and lock the navigation signal, assisting the satellite navigation receiver with navigation data on a separate satellite link, etc. However, these methods are generally expensive in terms of deployment costs, complexity of the satellite navigation receiver, etc.

A typical global navigation satellite system (GNSS) signal may be characterized by the following equation:

$$s(t)=c(t)*[r(t)\oplus d(t)]$$

where the parameter $s(t)$ refers to an output GNSS signal at a time instant t, the parameter $r(t)$ refers to a ranging code at the time instant t, the parameter $c(t)$ refers to a frequency of operation at the time instant t, and the parameter $d(t)$ refers to the navigation data transmitted by each satellite.

The navigation data transmitted by each satellite can be grouped into ephemeris data and almanac data. The ephemeris data comprises precise clock and Keplerian parameters, which are typically updated once every two hours. Typically, the ephemeris data or ephemerides are transmitted periodically once every two hours. The almanac data provides a coarse estimate of a satellite orbit, which is used for satellite visibility computations. The almanac data also comprises ionosphere delay estimation coefficients for single frequency users, for example, global positioning system (GPS) L1 users. The almanac data typically changes once in a day. The satellite state vectors of a satellite computed using the ephemeris data are used for estimation of a user position and velocity.

The satellite navigation receivers of conventional satellite navigation systems have generally been constrained by the amount of time taken for collecting the ephemeris data and the almanac data that constitute the navigation data. The delay in collecting the navigation data translates to multiple delays, for example, delays in computing satellite visibility, delays in estimation of ionosphere delay estimation coefficients, delays in cross-correlation detection based on the range estimated using the almanac data and an integrity check specified by the federal aviation administration (FAA) for beta-3 civil aviation receivers, etc. Conventional satellite navigation receivers take a relatively long time, for example, about 12.5 minutes to collect the almanac data for a single frequency user. This delays the estimation of the ionosphere error, which is an important parameter for estimation of the position of the satellite.

The typical time taken by a user in open sky conditions to collect ephemeris data and almanac data from the global positioning system (GPS) and the global navigation satellite system (GLONASS) is recorded. The ephemeris data collection time in a GLONASS is, for example, about 30 seconds, and the ephemeris data collection time in a GPS is, for example, about 30 seconds. The almanac data collection time in a GLONASS is, for example, about 150 seconds, while the almanac data collection time in a GPS is, for example, about 750 seconds.

Furthermore, a conventional satellite navigation system such as the global positioning system (GPS) transmits the navigation (NAV) data, for example, as "sub-frames", while the GLONASS transmits the NAV data, for example, as "strings". In the GPS, Keplerian parameters are transmitted as a part of the navigation data while in the GLONASS, the absolute state vectors of a satellite are transmitted. Existing GPS based systems employ an L1 sub-frame structure, with the first three sub-frames comprising the ephemeris data and the last two sub-frames dedicated to the almanac data. Each sub-frame contains 10 words and each word has 24 navigation data bits and 6 parity bits. The use of 6 parity bits per word translates to 60 parity bits per sub-frame, effectively constraining the data bandwidth and delaying the time to first fix. The data bits are transmitted at 50 bits per second (bps). Therefore, one complete sub-frame is transmitted in 30 seconds. For every 24 bits, six redundant bits are transmitted. This constrains the time taken for the collection of the ephemeris data and delays the TTFF.

Furthermore, in each sub-frame, existing words and bits, for example, telemetry (TLM) data, hand over word (HOW) data, a sub-frame identifier, etc., need to be transmitted. The almanac data is transmitted in two sub-frames, for example, sub-frames 4 and 5. Moreover, the almanac data comprises ionosphere correction terms and coordinated universal time (UTC) parameters. Further, in case of current almanac transmission methods deployed in a GPS, at any given instant of time, all satellites transmit the same information as part of sub-frames 4 and 5. The sub-frames 4 and 5 transmit almanac data for all the 25 pages with each almanac page comprising the almanac data of a particular satellite. Furthermore, with the current scheme of almanac data transmission, as for example in GPS based systems, it takes about 168 seconds for a seven-satellite satellite navigation system to collect almanac data. This delays the ionosphere error computation and thus delays accurate positioning in a satellite navigation receiver. Moreover, parameters such as UTC parameters compound the delay and bandwidth overhead since the UTC parameters need not be transmitted very frequently for computation of the user's position.

A navigation (NAV) data structure of the Galileo GNSS adopts a sub-frame architecture similar to that of a GPS based system. The navigation data structure uses a 12 sub-frame structure with each sub-frame comprising a series of pages. Each page comprises a synchronization pattern and navigation data symbols. Each navigation data symbol comprises a navigation data word and tail bits. The navigation data word comprises a 24-bit cyclic redundancy check (CRC) code. Further, as in the case of other modern global navigation satellite systems (GNSSs), the Galileo adopts half rate forward error correction (FEC) encoding. For the Galileo GNSS, the integrity bits are added to a packet of navigation data. However, Galileo uses a navigation data structure with a larger number of sub-frames and imposes constraints in terms of memory requirements and an increased amount of time required for transmitting the complete navigation data structure.

The GPS L5 satellite navigation system is a global navigation satellite system that employs navigation data transmission based on the transmission of text messages at a predefined rate. Each text message is identified based on a message identifier (ID). GPS L5 uses a half rate forward error correction (FEC) encoding scheme with a baud rate of 100 symbols per second (sps). The signal transmitted from an L5 satellite is at a power level of, for example, about −157 decibel-watt (dBW). The GPS L5 satellite navigation system allows variation of frequency of text message transmission. However, the GPS L5 system continues to employ a five sub-frame structure and needs about 30 seconds for complete transmission of all the sub-frames of the navigation data structure.

Furthermore, the transmission of almanac data in a conventional global navigation satellite system (GNSS), for example, a GPS based system comprises transmission of the same almanac data by all satellites in a constellation. For example, in a seven-satellite constellation employed by the Indian regional navigational satellite system (IRNSS), each satellite transmits the same almanac data at each time instant over a satellite channel. This increases the time overhead in almanac transmission and increases the almanac data collection time at the satellite navigation receiver, thereby delaying ionosphere estimation at the satellite navigation receiver. For example, in the IRNSS, seven almanac pages need to be transmitted as a part of the third sub-frame. On using an almanac transmission scheme typically used in a GPS, it takes about 168 seconds to completely transmit the almanac data.

The number of physical channels within a receiver is not a constraint due to improvements in semiconductor technology. Several receiver manufacturers have developed receivers with an excess of 200 channels, which exist concurrently. In addition, the receivers support all in view global navigation satellite system (GNSS) satellite signal processing. The modernized signals of a global positioning system (GPS), namely, L2C and L5, and the proposed signals of Galileo and Compass navigation systems have a minimum of at least two frequencies that support civilian applications. In parallel, there exists dedicated access to their military applications. With an assumption of dual frequency, there is a need for reducing the TTFF for civilian applications, and more importantly, for the restricted users.

A study was carried out on a signaling scheme of operational navigation systems with respect to multiple frequencies of operation. Of the parameters used to compute TTFF, collection time of ephemeris data ($T_{eph}$) is a major contributor as $T_{eph}$ completely depends on the navigation data structure of a particular constellation and does not depend on the satellite navigation receiver. As such, the TTFF is governed by the time required to collect ephemeris data. The objective is to reduce the $T_{eph}$ further without increasing the satellite data rate, the power required for data transmission, etc., and thus improve TTFF. An increased data rate necessitates more signal transmission power, which is a costly proposition onboard satellites.

Hence, there is a long felt but unresolved need for a method and a system that generate a navigation data structure with a few sub-frames, for example, three sub-frames, configure the navigation data in these sub-frames to selectively accommodate navigation data, and selectively transmit the generated navigation data structure with the configured navigation data to a satellite navigation receiver in reduced time to enable faster access to the navigation data and to reduce the TTFF for civilian users and restricted users.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method and the system disclosed herein address the above mentioned needs for generating a navigation data structure with a few sub-frames, for example, three sub-frames, configuring navigation data in these sub-frames to selectively accommodate navigation data, and selectively transmitting the generated navigation data structure with the configured navigation data to a satellite navigation receiver in reduced time to enable faster access to the navigation data and to reduce time to first fix (TTFF) for civilian users and restricted users. The method and the system disclosed herein provide a signal generation system, for example, in each of multiple satellites of a constellation. The signal generation system generates a navigation signal comprising a navigation data structure. The navigation data structure is configured to selectively accommodate navigation data. The navigation data structure disclosed herein comprises a first sub-frame, a second sub-frame, and a third sub-frame. The signal generation system configures the first sub-frame and the second sub-frame to accommodate selective ephemeris data of the navigation data. The configuration of the first sub-frame and the second sub-frame reduces time for collecting the ephemeris data by the satellite navigation receiver. The signal generation system configures the third sub-frame to accommodate a text message comprising almanac data, ionospheric data, coordinated universal time (UTC) data, textual data, for example, user defined data, and any combination thereof. The configuration of the third sub-frame reduces time for collecting the almanac data, the ionospheric data, the UTC data, and the textual data by the satellite navigation receiver.

In an embodiment, the text message in the third sub-frame of the generated navigation data structure is further configured to accommodate periodic non-positioning information extracted from the first sub-frame and the second sub-frame. As used herein, the term "non-positioning information" refers to information in the navigation data structure that does not directly contribute to determination of a geographical position of a user. The periodic non-positioning information comprises, for example, telemetry data collected from the navigation data. Each of the first sub-frame, the second sub-frame, and the third sub-frame of the generated navigation data structure comprises, for example, 288 bits of the navigation data and 6 bits of tail data. In an embodiment, the signal generation system appends a synchronization word to each of the first sub-frame, the second sub-frame, and the third sub-frame. The signal generation system configures the synchronization word to enable frame synchronization and identification of a sub-frame boundary of each of the first sub-frame, the second sub-frame, and the third sub-frame.

The signal generation system selectively groups the almanac data, the ionospheric data, and the coordinated universal time (UTC) data. For example, the signal generation system groups the UTC data with the ionospheric data, or the almanac data with the ionospheric data. In an embodiment, the signal generation system verifies integrity of the navigation data in the first sub-frame, the second sub-frame, and the third sub-frame of the generated navigation data structure for determining accuracy of the navigation data. The signal generation system selectively transmits the ephemeris data, the selectively grouped almanac data, ionospheric data, and UTC data, and the textual data in the generated navigation data structure to the satellite navigation receiver. The signal generation system alternatively transmits the ionospheric data and the UTC data with the almanac data and free of the almanac data in the third sub-frame in the generated navigation data structure to transmit the navigation data in reduced time, thereby reducing the TTFF in the satellite navigation receiver. Furthermore, the method and the system disclosed herein enable each of the satellites of a constellation to simultaneously and selectively transmit the selective ephemeris data, the selectively grouped almanac data, ionospheric data, and UTC data, and the textual data in the generated navigation data structure to the satellite navigation receiver, thereby allowing the satellite navigation receiver to collectively receive the selective ephemeris data, the almanac data, the ionospheric data, the UTC data, and the textual data in reduced time, thereby further reducing the TTFF in the satellite navigation receiver.

In an embodiment for reducing TTFF in a satellite navigation receiver in a single frequency of operation, the signal generation system configures the third sub-frame of the generated navigation data structure to accommodate a text message having only the ionospheric data and the coordinated universal time (UTC) data. The configuration of the third sub-frame reduces time for collecting the ionospheric data and the UTC data by the satellite navigation receiver. In an embodiment, the signal generation system determines a mode of operation for transmitting the navigation data in the generated navigation data structure. The mode of operation is, for example, a civilian mode or a restricted mode. The signal generation system transmits the ephemeris data, the ionospheric data, and the UTC data free of the almanac data in the generated navigation data structure to the satellite navigation receiver in the determined mode of operation, thereby reducing the TTFF in the satellite navigation receiver. The ionospheric data and the UTC data are transmitted by one of multiple satellites of a constellation to the satellite navigation receiver. Furthermore, in this embodiment, the signal generation system alters transmission of the navigation data after the transmission of the ionospheric data and the UTC data to further reduce the TTFF in the satellite navigation receiver.

In the civilian mode of operation, the signal generation system staggers the navigation data in each of the sub-frames of the generated navigation data structure into a first portion and a second portion. In an embodiment, the signal generation system determines a mode of service, for example, a civilian mode of service, a restricted mode of service, etc., for transmitting the staggered navigation data in the generated navigation data structure. Each of multiple satellites of a constellation parallelly transmits each of the sub-frames of the generated navigation data structure comprising distinct staggered navigation data over a first carrier frequency, for example, the L5 frequency, and a second carrier frequency, for example, the S1 frequency in the determined mode of service to obtain the navigation data in reduced time, thereby reducing the TTFF in the satellite navigation receiver in the civilian mode of operation.

Each of the satellites is configured to transmit distinct staggered navigation data on each of the first carrier frequency and the second carrier frequency. In the civilian mode of operation, the signal generation system sequentially transmits the first portion and the second portion of each of the sub-frames over the first carrier frequency and the second carrier frequency in a first mode of service, for example, the civilian mode of service. The signal generation system sequentially transmits a complementary of the first portion and the second portion of each of the sub-frames over the second carrier frequency and the first carrier frequency in a second mode of service, for example, the restricted mode of service. The signal generation system sequentially sweeps the textual data in the generated navigation data structure cyclically across the satellites on each of the first carrier frequency and the second carrier frequency in the first mode of service or the second mode of service. Furthermore, the signal generation system alternatively transmits the textual data, the ionospheric data, and the coordinated universal time (UTC) data of the navigation data in the sub-frames on the first carrier frequency or the second carrier frequency.

In the restricted mode of operation, the signal generation system staggers the navigation data in each of the sub-frames of the generated navigation data structure into a first portion and a second portion. In an embodiment, the signal generation system determines a mode of service, for example, a civilian mode of service, a restricted mode of service, etc., for transmitting the staggered navigation data in the generated navigation data structure. Each of the satellites of a constellation parallelly transmits each of the sub-frames over a first carrier frequency, for example, the L5 frequency, and a second carrier frequency, for example, the S1 frequency in the determined mode of service to obtain the navigation data in reduced time, thereby reducing the TTFF in the satellite navigation receiver in the restricted mode of operation. The signal generation system parallelly transmits each of the sub-frames by: sequentially transmitting the first portion and the second portion of each of the sub-frames over the first carrier frequency, and a complementary of the first portion and the second portion of each of the sub-frames over the second carrier frequency in a first mode of service, for example, the civilian mode of service to obtain time of week (TOW) data; sequentially transmitting the second portion of one sub-frame and the first portion of another sub-frame, and a complementary of the second portion of one sub-frame and the first portion of the other sub-frame over the first carrier frequency in a second mode of service, for example, the restricted mode of service; and sequentially transmitting the first portion of one sub-frame and the second portion of another sub-frame, and a complementary of the first portion of one sub-frame and the second portion of the other sub-frame over the second carrier frequency in the second mode of service, for example, the restricted mode of service. The first mode of service assists the second mode of service for availing the obtained TOW data in reduced time, thereby reducing the TTFF in the satellite navigation receiver.

The satellite navigation receiver disclosed herein receives navigation signals comprising the navigation data in the generated navigation data structure from multiple satellites of a constellation. The satellite navigation receiver extracts the navigation data from the received navigation signals. The satellite navigation receiver determines a sub-frame boundary of each of the first sub-frame, the second sub-frame, and the third sub-frame in the generated navigation data structure, for example, by searching for a synchronization word in the generated navigation data structure. The satellite navigation receiver decodes each of the first sub-frame, the second sub-frame, and the third sub-frame in the generated navigation data structure for extracting the navigation data. The satellite navigation receiver performs a cyclic redundancy check operation on the extracted navigation data for validating the extracted navigation data. The satellite navigation receiver extracts the selective ephemeris data, the almanac data, the ionospheric data, the coordinated universal time (UTC) data, and the textual data from the validated navigation data based on a sub-frame identifier.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

FIG. 4 exemplarily illustrates a table showing types of text messages transmitted at different time instances as part of a third sub-frame in the three sub-frame normal navigation data structure.

FIG. 14 illustrates a table showing a comparison of the three sub-frame normal navigation data structure and the three sub-frame fixed navigation data structure with a global positioning system based system.

FIG. 15 illustrates a table showing the time to first fix for a satellite navigation receiver operating in a civilian mode of operation in a single carrier frequency as well as a dual carrier frequency.

FIG. 16 illustrates a table showing the time to first fix for a satellite navigation receiver operating in a restricted mode of operation in a single carrier frequency as well as a dual carrier frequency.

DETAILED DESCRIPTION OF THE INVENTION

Figure 1:
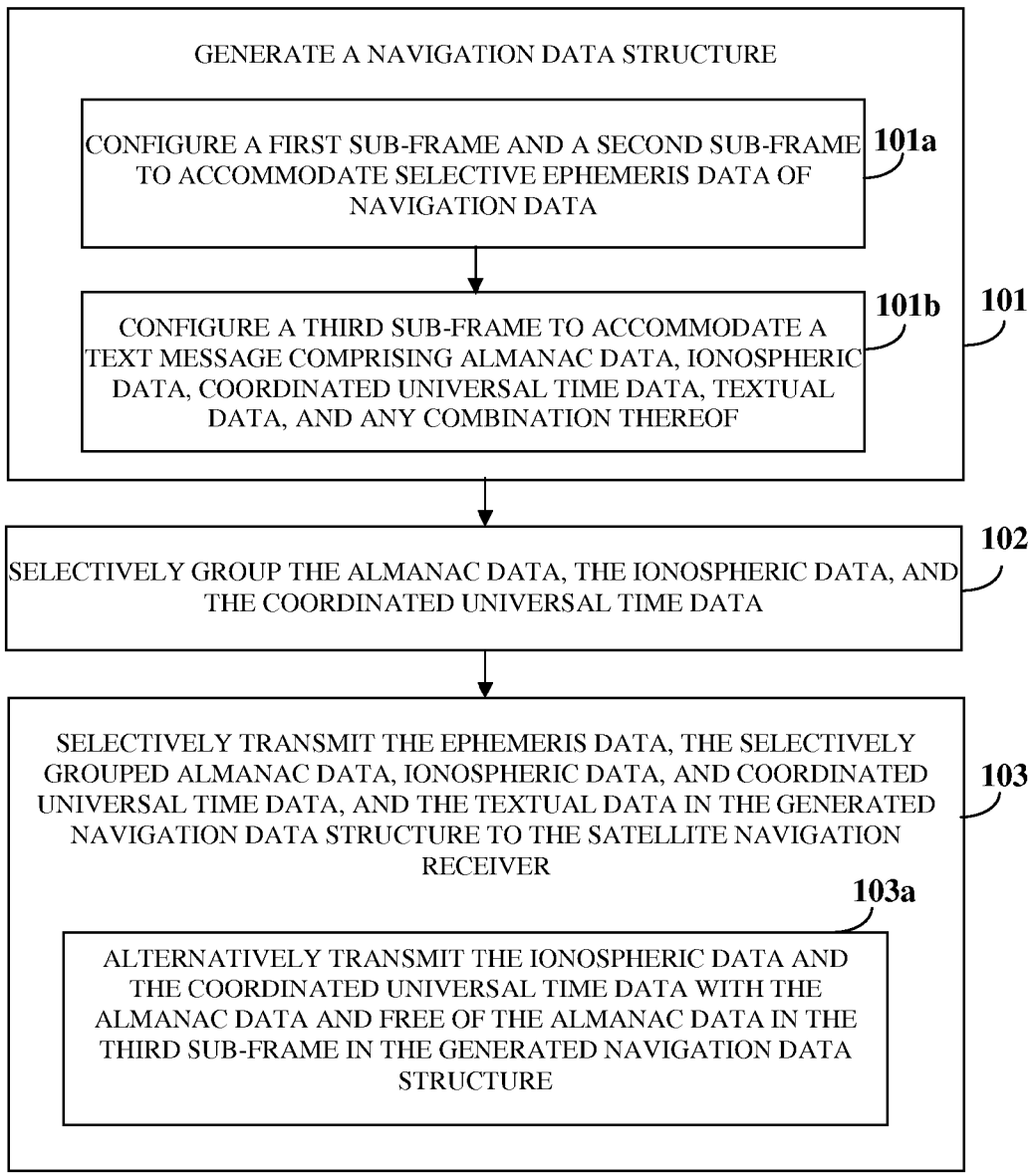
FIG. 1 illustrates a method for reducing time to first fix in a satellite navigation receiver.

FIG. 1 illustrates a method for reducing time to first fix (TTFF) in a satellite navigation receiver, for example, a single or dual frequency Indian regional navigational satellite system (IRNSS) receiver. The method disclosed herein reduces the TTFF by reducing ephemeris time $T_{eph}$ of the satellite navigation receiver in a single frequency mode of operation without increasing satellite data rate or power required for transmission of navigation data by the satellites. An optimal TTFF, that is, a minimal time required to transmit navigation data for "n" visible satellites with "j" sub-frames is computed using the formula below:

$$TTFF_{opt}=\min_t \Sigma_n \Sigma_j SF_{j\text{-}enc}$$

The navigation data transmitted by each satellite comprises primary navigation data and secondary navigation data. The ephemeris and clock parameters of the satellites constitute the primary navigation data whereas almanac data, coordinated universal time (UTC) data, ionospheric data such as correction terms, and message type constitutes the secondary navigation data. To achieve an optimal TTFF, the navigation data parameters need to be transmitted faster or the number of primary navigation data parameters need to be reduced. The navigation data parameters are decomposed into primary navigation data parameters and secondary navigation data parameters. The minimal time required to transmit navigation data for "n" visible satellites with "j" sub-frames is therefore computed using the formula below:

$$TTFF_{opt}=\min_t \Sigma_n \Sigma_j SF_{j\text{-}pri}+\min_t \Sigma_n \Sigma_j SF_{j\text{-}sec}$$

where $SF_{j\text{-}pri}$ and $SF_{j\text{-}sec}$ are the sub-frame symbols associated with the primary navigation data parameters and the secondary navigation data parameters respectively.

To estimate user position, the satellite navigation receiver needs to collect the ephemeris and clock parameters from satellites, which constitute the primary navigation data parameters. As such, TTFF is governed by the time required to collect the primary navigation data parameters. The method disclosed herein enhances the TTFF by increasing periodicity of the primary navigation data parameters, which is achieved by reducing the rate of transmission of secondary navigation data parameters as shown in the formula below:

$$TTFF_{opt}=\min_t \Sigma_n \Sigma_j SF_{j\text{-}pri}+\{\min_t \Sigma_n \Sigma_j SF_{j\text{-}sec}\}_{constrained}$$

The method disclosed herein provides a signal generation system, for example, in each of multiple satellites of a constellation, for generating 101 a navigation data structure configured to accommodate navigation data. The navigation data structure comprises a first sub-frame, a second sub-frame, and a third sub-frame. The signal generation system configures 101a the first sub-frame and the second sub-frame to accommodate selective ephemeris data of the navigation data. As used herein, the term "selective ephemeris data" refers to essential ephemeris parameters that define orbital information of a satellite. The selective ephemeris data comprises, for example, a clock data reference time of week (TOW), a reference time ephemeris parameter, clock correction parameters, Keplerian parameters, group delay differential correction terms, etc. The configuration of the first sub-frame and the second sub-frame reduces time for collecting the ephemeris data by the satellite navigation receiver.

The signal generation system configures 101b the third sub-frame to accommodate a text message comprising almanac data, ionospheric data, coordinated universal time (UTC) data, textual data such as user defined data, and any combination thereof. The configuration of the third sub-frame reduces time for collecting the almanac data, the ionospheric data, the UTC data, and the textual data by the satellite navigation receiver. In an embodiment, the signal generation system configures the text message in the third sub-frame of the generated navigation data structure to accommodate periodic non-positioning information extracted from the first sub-frame and the second sub-frame. As used herein, the term "non-positioning information" refers to information in the navigation data structure that does not directly contribute to determination of a geographical position of a user. The periodic non-positioning information comprises, for example, telemetry data collected from the navigation data.

The signal generation system selectively groups 102 the almanac data, the ionospheric data, and the coordinated universal time (UTC) data. For example, the signal generation system groups the UTC data with the ionospheric data, or the almanac data with the ionospheric data, or the almanac data with the UTC data in the third sub-frame. The signal generation system selectively transmits 103 the ephemeris data, the selectively grouped almanac data, ionospheric data, and UTC data, and the textual data in the generated navigation data structure to the satellite navigation receiver. The signal generation system alternatively transmits 103a the ionospheric data and the UTC data with the almanac data and free of the almanac data in the third sub-frame in the generated navigation data structure to transmit the navigation data in reduced time, thereby reducing the TTFF in the satellite navigation receiver. In an example, the ionospheric data and the UTC data are transmitted with the almanac data at a time instance "$T_0$", and the ionospheric data and the UTC data are transmitted free of the almanac data at a time instance "$T_0+6$". Each of the satellites of a constellation simultaneously and selectively transmits the selective ephemeris data, the selectively grouped almanac data, ionospheric data, and UTC data, and the textual data in the generated navigation data structure to the satellite navigation receiver, thereby allowing the satellite navigation receiver to collectively receive the selective ephemeris data, the almanac data, the ionospheric data, the UTC data, and the textual data in reduced time, thereby further reducing the TTFF in the satellite navigation receiver.

The satellite navigation receiver receives navigation signals comprising the navigation data in the generated navigation data structure from multiple satellites of a constellation. For example, the single frequency satellite navigation receiver receives navigation signals from seven satellites of a seven-satellite constellation associated with the Indian regional navigational satellite system (IRNSS). The satellite navigation receiver extracts the navigation data from the received navigation signals as follows: The satellite navigation receiver determines a sub-frame boundary of each of the first sub-frame, the second sub-frame, and the third sub-frame in the generated navigation data structure by searching for a synchronization word in the generated navigation data structure. The synchronization word is, for example, a string of data bits with a predetermined value. The satellite navigation receiver decodes each of the first sub-frame, the second sub-frame, and the third sub-frame in the generated navigation data structure for extracting the navigation data. The satellite navigation receiver performs a cyclic redundancy check operation on the extracted navigation data for validating the extracted navigation data. The satellite navigation receiver extracts the selective ephemeris data, the almanac data, the ionospheric data, the coordinated universal time (UTC) data, and the textual data from the validated navigation data based on a sub-frame identifier.

Figure 2:
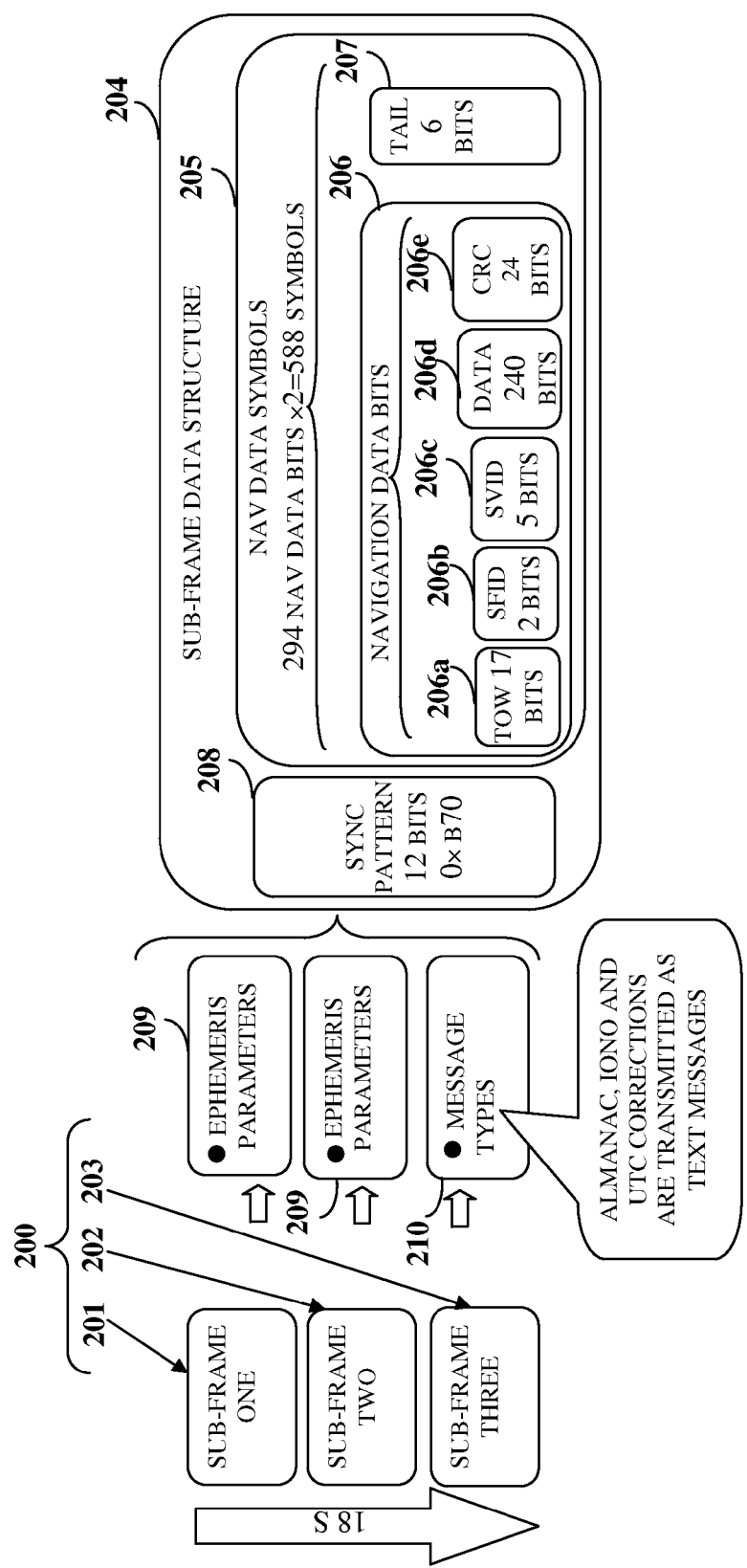
FIG. 2 exemplarily illustrates a navigation data structure generated by a signal generation system.

FIG. 2 exemplarily illustrates a navigation data structure 200 generated by the signal generation system. The navigation data structure disclosed in the co-pending non-provisional patent application number 4231/CHE/2011 titled "Navigation Data Structure Generation And Data Transmission For Optimal Time To First Fix" comprises a first sub-frame 201, a second sub-frame 202, a third sub-frame, and a fourth sub-frame. A method for achieving the formula below is by staggering the third sub-frame and the fourth sub-frame of the navigation data structure and transmitting the third sub-frame and the fourth sub-frame alternatively as the third sub-frame 203.

$$TTFF_{opt} = \min_n \Sigma_n \Sigma_j SF_{j\text{-}pri} + \{\min_n \Sigma_n \Sigma_j SF_{j\text{-}sec}\}_{constrained}$$

The first sub-frame 201 and the second sub-frame 202 of the navigation data structure are retained as in the four sub-frame method disclosed in the co-pending non-provisional patent application number 4231/CHE/2011. The resulting navigation data structure 200 comprising three sub-frames, that is, the first sub-frame 201, the second sub-frame 202, and the third sub-frame 203 as exemplarily illustrated in FIG. 2, is herein referred to as a "three sub-frame normal (TSN) navigation data structure". The signal generation system generates the TSN navigation data structure 200 by configuring the first sub-frame 201, the second sub-frame 202, and the third sub-frame 203 as disclosed in the detailed description of FIG. 1. The first sub-frame 201 and the second sub-frame 202 accommodate the ephemeris data, that is, the ephemeris parameters 209. The third sub-frame 203 selectively accommodates the almanac data, the ionospheric data, the coordinated universal time (UTC) data, the textual data, or any combination thereof, in different message types 210 as disclosed in the detailed description of FIG. 4. In the TSN navigation data structure 200, the first sub-frame 201 and the second sub-frame 202 are dedicated to the ephemeris and clock parameters. The almanac data is grouped along with the textual data and transmitted alternatively in the third sub-frame 203 as exemplarily illustrated in FIG. 3. The UTC data and the ionospheric data, for example, the ionosphere correction terms are always transmitted in the third sub-frame 203 to ensure that the UTC data and the ionospheric data are transmitted every 18 seconds.

Each of the first sub-frame 201, the second sub-frame 202, and the third sub-frame 203 has a sub-frame data structure 204 comprising navigation data bits 206 and tail bits 207. Each of the first sub-frame 201, the second sub-frame 202, and the third sub-frame 203 of the generated navigation data structure 200 comprises 288 navigation data bits 206 and 6 tail bits 207. The navigation data bits 206 comprise 17 bits of data on time of week (TOW) 206a, 2 bits of a sub-frame identifier (ID) 206b, 5 bits of a satellite vehicle identification (SVID) 206c number, 240 bits of navigation data 206d, and 24 bits of a cyclic redundancy check (CRC) code 206e. The tail bits 207 of the sub-frame data structure 204 are 6 bits long. The CRC code 206e verifies integrity of the navigation data in the first sub-frame 201, the second sub-frame 202, and the third sub-frame 203 of the generated navigation data structure 200 for determining accuracy of the navigation data as disclosed in the co-pending non-provisional patent application number 4231/CHE/2011 titled "Navigation Data Structure Generation and Data Transmission For Optimal Time To First Fix".

The signal generation system generates symbols 205 of the navigation data bits 206, herein referred to as "navigation data symbols", for example, by applying forward error correction (FEC) encoding to each of the sub-frames 201, 202, and 203. The sum of the navigation data bits 206 is 294 bits and the navigation data bits 206 are converted to navigation data symbols 205 resulting in 588 symbols. Furthermore, the signal generation system appends a synchronization word 208, for example, a synchronization pattern of 12 bits to each of the first sub-frame 201, the second sub-frame 202, and the third sub-frame 203 during generation of the navigation data structure 200. The configuration of the synchronization word 208 enables frame synchronization and identification of a sub-frame boundary of each of the first sub-frame 201, the second sub-frame 202, and the third sub-frame 203. A data generation unit within the signal generation system transmits the navigation data symbols 205 of all the visible satellites to a processing unit within the signal generation system for generating a radio frequency navigation signal.

Figure 3:
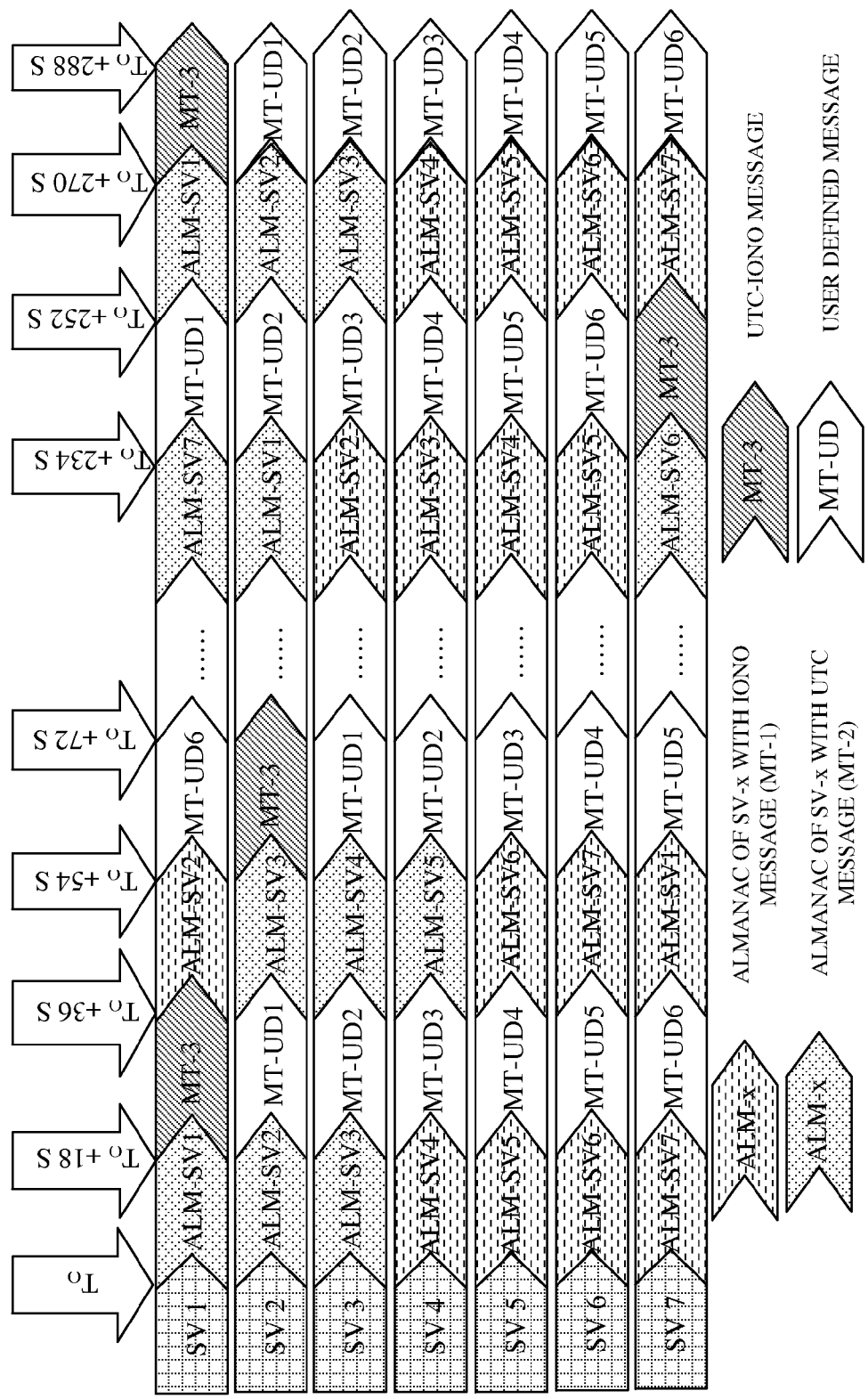
FIG. 3 exemplarily illustrates transmission of navigation data in a three sub-frame normal navigation data structure by each satellite of a seven-satellite constellation in an Indian regional navigational satellite system.

FIG. 3 exemplarily illustrates transmission of navigation data in a three sub-frame normal (TSN) navigation data structure 200 shown in FIG. 2, by each satellite of a seven-satellite constellation in the Indian regional navigational satellite system (IRNSS). The signal generation system implemented in each of the satellites generates the TSN navigation data structure 200 and configures the navigation data in the TSN navigation data structure 200 by selectively grouping the almanac data, the ionospheric data, and the coordinated universal time (UTC) data for accommodation in the third sub-frame 203. The signal generation system always transmits the UTC data and the ionospheric data in the third sub-frame 203 exemplarily illustrated in FIG. 2, which ensures that the UTC data and the ionospheric data are transmitted every 18 seconds. As exemplarily illustrated in FIG. 3, the signal generation system completes the transmission of the third sub-frame 203 every $((T_0+18)*N)$ seconds, where "N" takes values from 1 to 33600, that is, 604800 seconds in a week divided by 18 seconds. For odd values of "N", the signal generation system transmits the almanac data and for even values of "N", the signal generation system transmits textual messages, that is, any user defined data as exemplarily illustrated in FIG. 4. In an example, the signal generation system groups and transmits the UTC data and the ionospheric data along with the almanac data for N=1, 3, 5, etc. As exemplarily illustrated in FIG. 3, three satellite vehicles, SV1, SV2, and SV3 transmit the almanac data with the UTC data in the third sub-frame 203, while four satellite vehicles, SV4, SV5, SV6, and SV7 transmit the almanac data with the ionospheric data in the third-sub-frame 203. In another example, the signal generation system groups the UTC data and the ionospheric data in one text message and transmits the UTC data and the ionospheric data free of almanac data for N=2, 4, 6, etc., in one satellite. For odd and even values of "N", the signal generation system straddles pages in time to ensure that each satellite transmits the navigation data independently.

As exemplarily illustrated in FIG. 3, at a time instance "$T_0$", satellites SV1, SV2, and SV3 of the seven-satellite constellation transmit the almanac data grouped with the coordinated universal time (UTC) data, and the satellites SV4, SV5, SV6, and SV7 of the seven-satellite constellation transmit the almanac data grouped with the ionospheric data.

The UTC data and the ionospheric data are transmitted every 18 seconds. For example, the satellite SV1 groups the UTC data with the ionospheric data represented as MT-3 and transmits the grouped UTC data and the ionospheric data at time instance ($T_0$+18) seconds as exemplarily illustrated in FIG. 3. The textual data, for example, user defined data is represented as "MT-UD1", "MT-UD2", etc., and transmitted by satellites SV2, SV3, SV4, SV5, SV6, and SV7 at a time instance ($T_0$+18) seconds as exemplarily illustrated in FIG. 3. The transmission of navigation data in this three sub-frame normal (TSN) navigation data structure 200 makes the ephemeris page available to the user from all the visible satellites within 18 seconds and therefore allows faster estimation of the user's position. The ionospheric data and the UTC data being available once every 18 seconds can be applied to correct measurements and to obtain an accurate time estimate respectively.

FIG. 4 exemplarily illustrates a table showing types of text messages transmitted at different time instances as part of a third sub-frame 203 in the three sub-frame normal (TSN) navigation data structure 200 exemplarily illustrated in FIG. 2. The signal generation system configures the third sub-frame 203 of the generated navigation data structure 200 to selectively accommodate a text message comprising almanac data, ionospheric data, coordinated universal time (UTC) data, or any combination thereof. The primary navigation data used for TTFF and positioning are transmitted within 18 seconds as opposed to 24 seconds in a four sub-frame navigation data structure. This translates to a 40% reduction in ephemeris time $T_{eph}$ as compared to global positioning system (GPS) or global navigation satellite system (GLONASS) L1. The signal generation system completes the transmission of the third sub-frame 203 every ((T0+18)*N) seconds, where "N" takes values from 1 to 33600, that is, 604800 seconds in a week/18 seconds. For odd values of "N", the signal generation system staggers the almanac data in all seven satellites and for even values of "N", the signal generation system staggers the text messages in one of the seven satellites. For example, the UTC data and the ionospheric data are grouped and transmitted along with the almanac data for N=1, 3, 5 . . . 33599. In another example, the UTC data and the ionospheric data are grouped and transmitted as text messages free of almanac data for N=2, 4, 6 . . . 33600.

Figure 5:
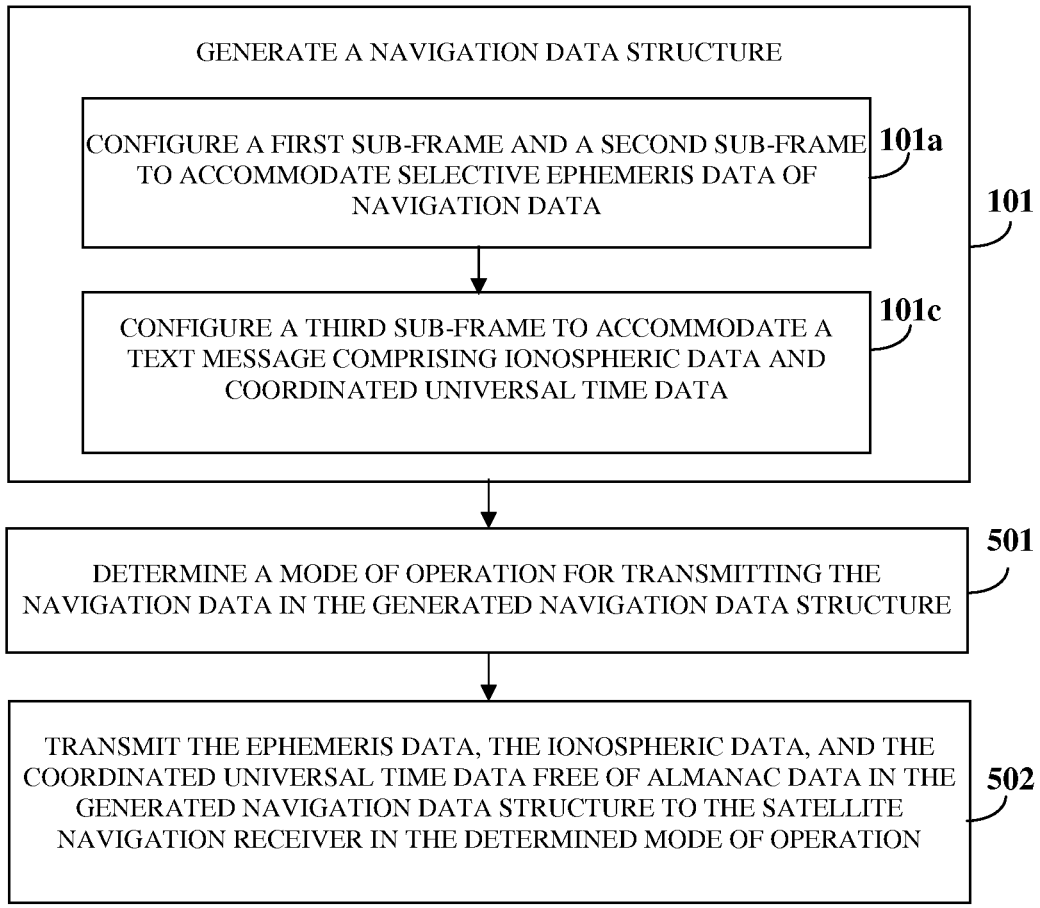
FIG. 5 illustrates a method for reducing time to first fix in a satellite navigation receiver in a single frequency of operation.

FIG. 5 illustrates a method for reducing time to first fix (TTFF) in a satellite navigation receiver in a single frequency of operation. The signal generation system generates 101 a navigation data structure 200 comprising a first sub-frame 201, a second sub-frame 202, and a third sub-frame 203 configured to accommodate navigation data. The signal generation system configures 101a the first sub-frame 201 and the second sub-frame 202 to accommodate selective ephemeris data of the navigation data as disclosed in the detailed description of FIGS. 1-2. The signal generation system configures 101c the third sub-frame 203 to accommodate a text message having ionospheric data and coordinated universal time (UTC) data. The configuration of the third sub-frame 203 reduces time for collecting the ionospheric data and the UTC data by the satellite navigation receiver. In an embodiment, the signal generation system determines 501 a mode of operation for transmitting the navigation data in the generated navigation data structure 200. The mode of operation is, for example, a civilian mode or a restricted mode. The signal generation system transmits 502 the ephemeris data, the ionospheric data, and the UTC data free of almanac data in the generated navigation data structure 200 to the satellite navigation receiver in the determined mode of operation, thereby reducing the TTFF in the satellite navigation receiver. One of the satellites of a constellation transmits the ionospheric data and the UTC data to the satellite navigation receiver.

The theoretically achievable TTFF limit in a single frequency of operation for the Indian regional navigational satellite system (IRNSS) assumes that the UTC data and the ionospheric data are transmitted only as a part of secondary navigation data as in GPS L1. With this assumption, the signal generation system generates an optimal navigation data structure referred to as a three sub-frame fixed (TSF) navigation data structure 200 for achieving optimal TTFF. With the assumption that the almanac data is redundant for the IRNSS, the signal generation system reduces the formula below:

$$TTFF_{opt} = \min_t \Sigma_n \Sigma_j SF_{j\text{-}pri} + \{\min_t \Sigma_n \Sigma_j SF_{j\text{-}sec}\}_{constrained}$$

to $$TTFF_{opt} = \min_t \Sigma_n \Sigma_j SF_{j\text{-}pri} + \{\min_t \Sigma_n \Sigma_j SF_{j\text{-}sec}\}_{fixed, constrained}$$

Figure 6:
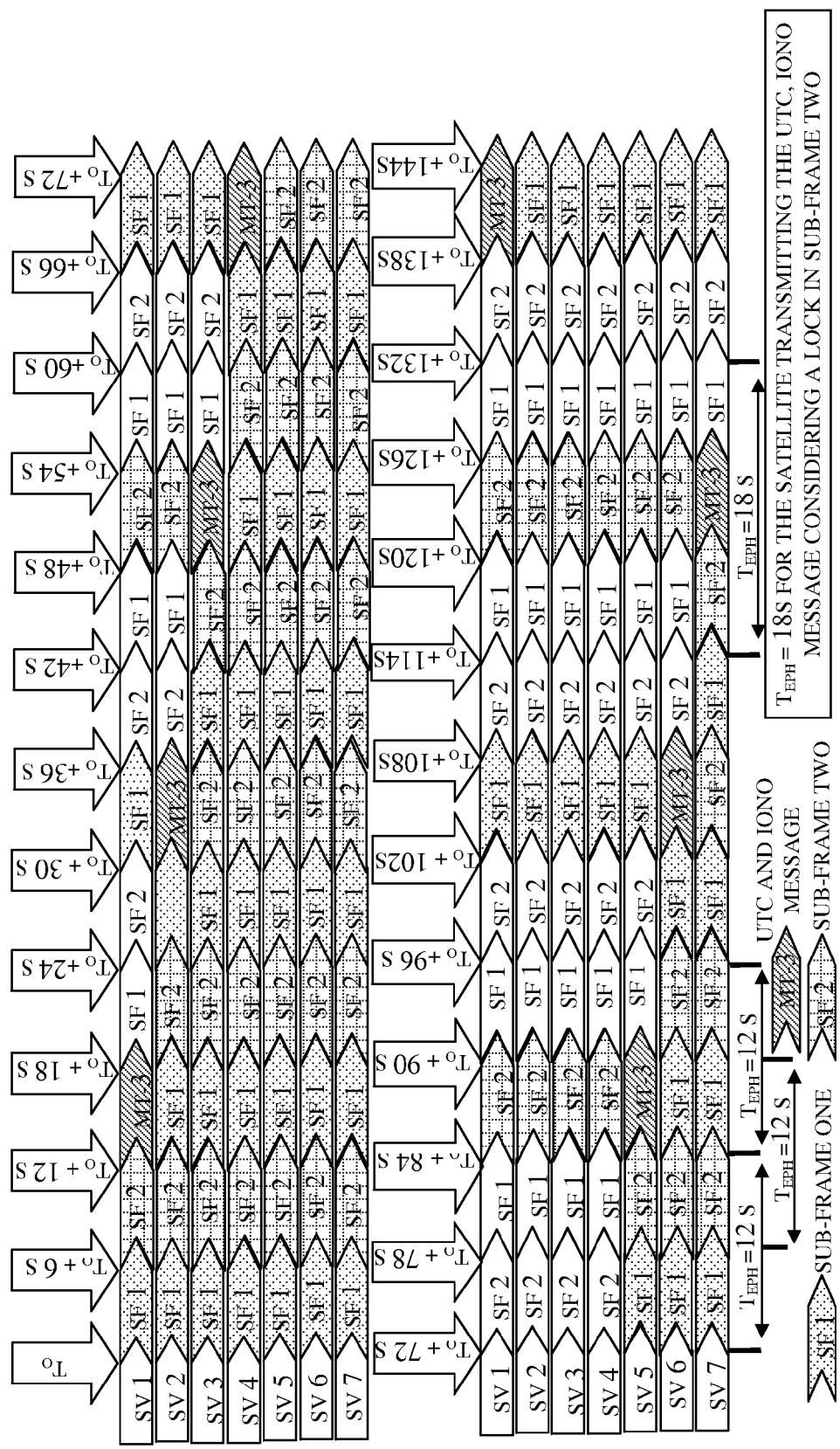
FIG. 6 exemplarily illustrates transmission of navigation data in a three sub-frame fixed navigation data structure by each satellite of a seven-satellite constellation in an Indian regional navigational satellite system.

FIG. 6 exemplarily illustrates transmission of navigation data in a three sub-frame fixed (TSF) navigation data structure 200 exemplarily illustrated in FIG. 2, by each satellite of a seven-satellite constellation in the Indian regional navigational satellite system (IRNSS). The signal generation system implemented in each of the satellites staggers the coordinated universal time (UTC) data and the ionospheric data of the navigation data satellite wise in fixed slots and transmits the UTC data and the ionospheric data free of the almanac data as part of the third sub-frame 203 in the TSF navigation data structure 200. The first sub-frame 201 and the second sub-frame 202 transmit the ephemeris data and clock parameters of the satellites as disclosed in the detailed description of FIGS. 1-2. The third sub-frame 203 of one of the satellites of the seven-satellite constellation then transmits the UTC data and the ionospheric data, which appear once in 18 seconds from the constellation as exemplarily illustrated in FIG. 6. For example, at time instance "$T_0$" each satellite of the seven-satellite constellation transmits the first sub-frame 201. At time instance ($T_0$+6) seconds, each satellite of the seven-satellite constellation transmits the second sub-frame 202. At time instance ($T_0$+12) seconds, the first satellite of the seven-satellite constellation transmits the UTC data and the ionospheric data denoted as a MT-3 message in FIG. 6, while the other satellites of the seven-satellite constellation transmit the first sub-frame 201. The UTC data and the ionospheric data are therefore transmitted once every 18 seconds by one of the satellites of the seven-satellite constellation. For example, after the first 18 seconds, the first satellite SV1 transmits the UTC data and the ionospheric data; after the next 18 seconds, the second satellite SV2 transmits the UTC data and the ionospheric data, and so on as exemplarily illustrated in FIG. 6.

In an embodiment, the signal generation system alters the transmission of the navigation data after the transmission of the ionospheric data and the UTC data to further reduce the TTFF in the satellite navigation receiver, that is, there is a change in the sub-frame slotting following the transmission of the UTC data and the ionospheric data. For example, satellite SV1, after ($T_0$+18) seconds, transmits the first sub-frame 201 instead of transmitting the second sub-frame 202 commensurate with other satellites as exemplarily illustrated in FIG. 6. This ensures that the maximum time required to collect the ephemeris data from the satellite is restricted to 18 seconds. With the primary navigation data available from six satellites, the satellite navigation receiver can estimate the position within 12 seconds. However, with the ionospheric data and the UTC data being transmitted periodically every 18 seconds, the corrections are restricted to 18 seconds. A limitation with this method is that the ephemeris data is available only from six satellites, as opposed to all seven satellites. For example, between time periods ($T_0$+12) seconds to ($T_0$+18) seconds, the ephemeris data is available for 6 seconds. Therefore, for 6 seconds, the position dilution of precision (PDOP) which is a measure of satellite geometry that indicates accuracy of measurements with respect to position, will be relatively high, which is acceptable for the IRNSS, which is a regional constellation.

Figure 7:
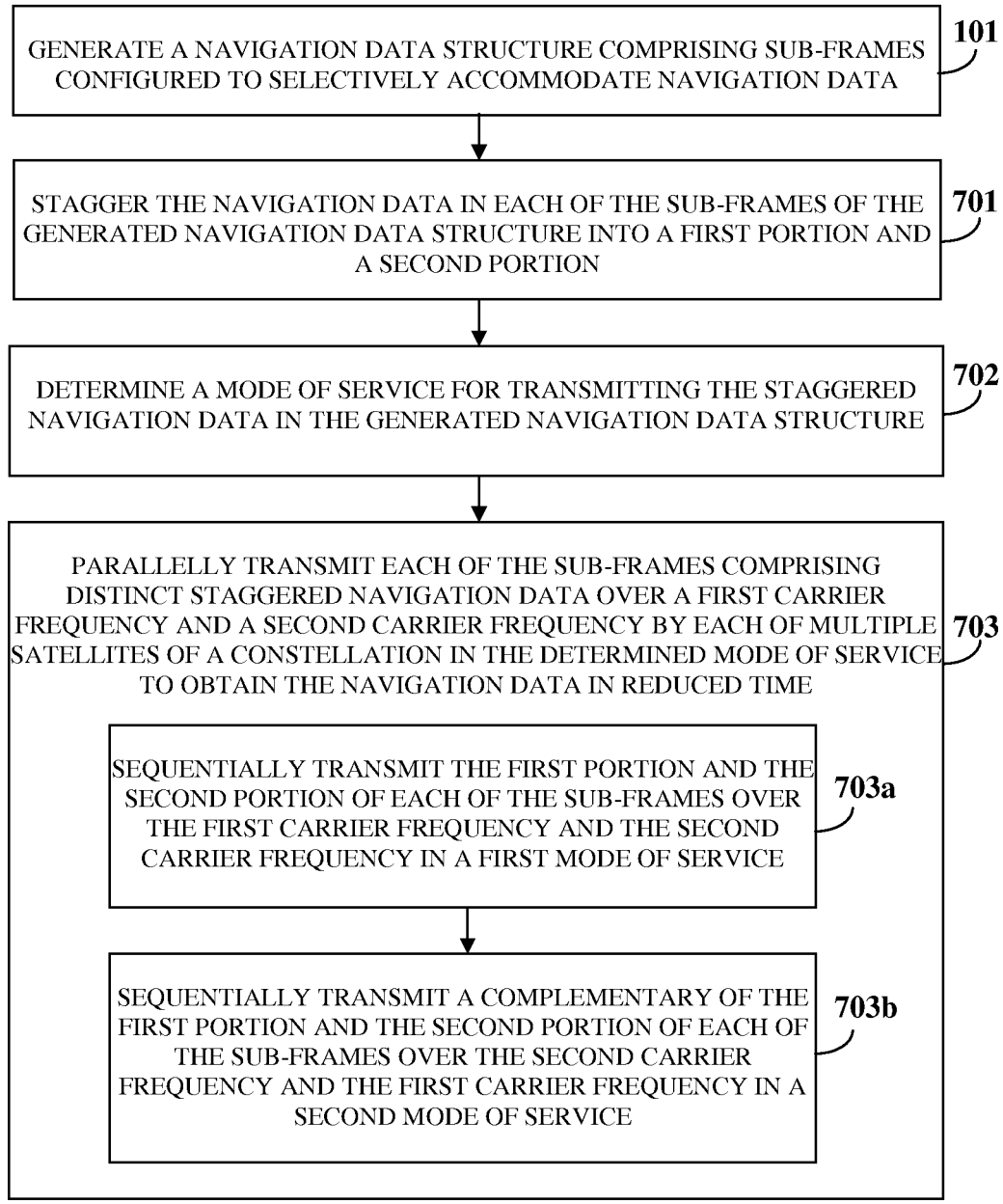
FIG. 7 illustrates a method for reducing time to first fix in a satellite navigation receiver operating in a civilian mode of operation.

FIG. 7 illustrates a method for reducing time to first fix (TTFF) in a satellite navigation receiver operating in a civilian mode of operation. The signal generation system implemented in each of the satellites of a constellation generates 101 a navigation data structure 200 comprising sub-frames 201, 202, and 203 as exemplarily illustrated in FIG. 2, configured to selectively accommodate navigation data. In this method, selective ephemeris data, ionospheric data, coordinated universal time (UTC) data, textual data, and any combination thereof constitute the navigation data as disclosed in the detailed description of FIG. 5. The configuration of the sub-frames 201, 202, and 203 reduces time for collecting the navigation data by the satellite navigation receiver. The signal generation system staggers 701 the navigation data in each of the sub-frames 201, 202, and 203 of the generated navigation data structure 200 into a first portion and a second portion as exemplarily illustrated in FIG. 9B. In an embodiment, the signal generation system determines 702 a mode of service, for example, a standard positioning service (SPS), a restricted service (RES), etc., for transmitting the staggered navigation data in the generated navigation data structure 200.

Each of the satellites of a constellation then parallelly transmits 703 each of the sub-frames 201, 202, and 203 of the generated navigation data structure 200 comprising distinct staggered navigation data over a first carrier frequency, for example, a L5 frequency, and a second carrier frequency, for example, a S1 frequency, in the determined mode of service to obtain the navigation data in reduced time, thereby reducing the TTFF in the satellite navigation receiver in the civilian mode of operation. Each of the satellites is configured to transmit distinct staggered navigation data on each of the first carrier frequency and the second carrier frequency. Each of the satellites sequentially transmits 703a the first portion and the second portion of each of the sub-frames 201, 202, and 203 over the first carrier frequency and the second carrier frequency in a first mode of service, for example, a standard positioning service (SPS) as disclosed in the detailed description of FIG. 9A. Each of the satellites sequentially transmits 703b a complementary of the first portion and the second portion of each of the sub-frames 201, 202, and 203 over the second carrier frequency and the first carrier frequency in the second mode of service, for example, a restricted service as disclosed in the detailed description of FIG. 9A. The satellites transmit the textual data, the ionospheric data, and the UTC data of the navigation data alternatively in the sub-frames 201, 202, and 203 on the first carrier frequency or the second carrier frequency. The textual data is sequentially swept cyclically across the satellites on each of the first carrier frequency and the second carrier frequency in the first mode of service or the second mode of service.

Figure 8:
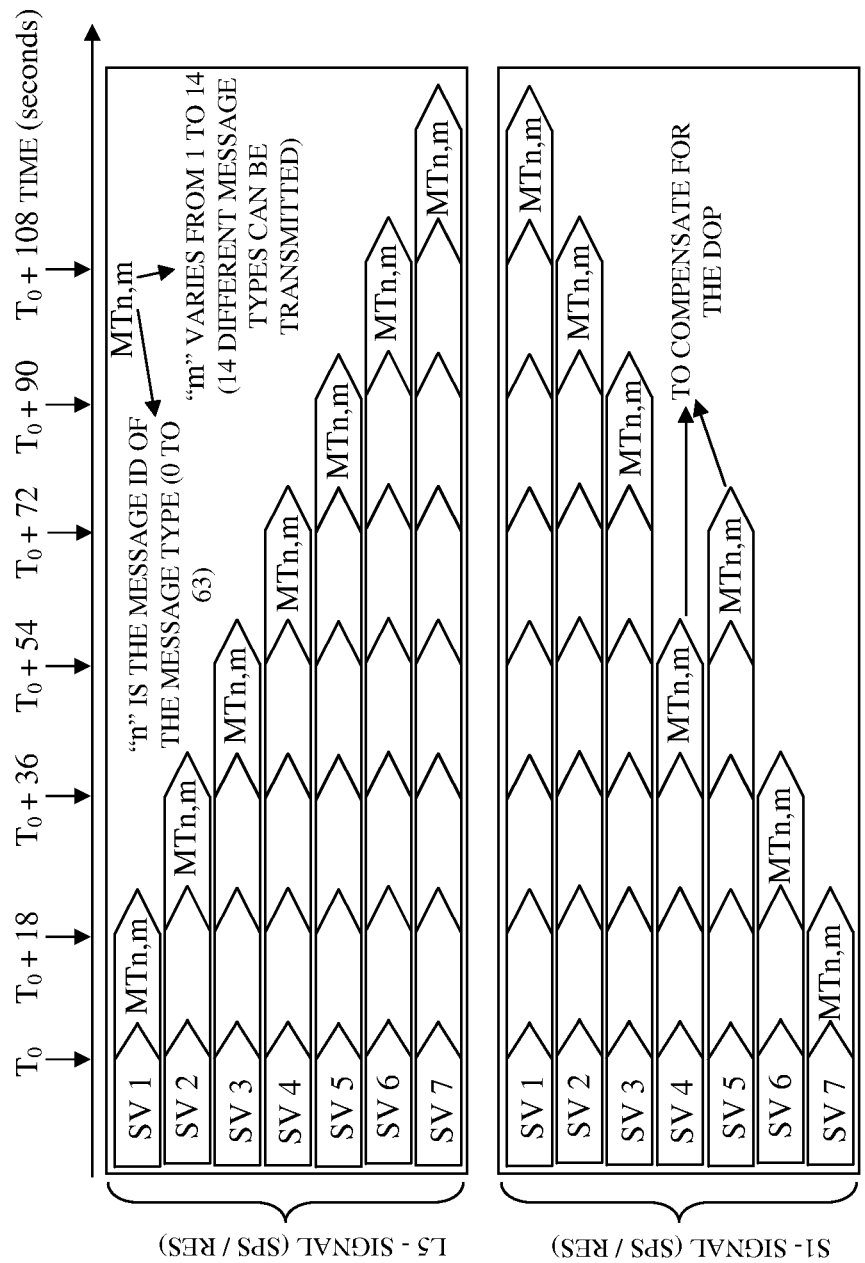
FIG. 8 exemplarily illustrates a timing diagram showing transmission slots of text messages for a satellite navigation receiver operating in the civilian mode of operation.

FIG. 8 exemplarily illustrates a timing diagram showing transmission slots of text messages for a satellite navigation receiver operating in the civilian mode of operation. The method disclosed herein adopts the three sub-frame fixed (TSF) navigation data structure 200 exemplarily illustrated in FIG. 2 and as disclosed in the detailed description of FIGS. 5-6 for a satellite navigation receiver operating in the civilian mode of operation. The TSF navigation data structure 200 comprises a first sub-frame 201, a second sub-frame 202, and a third sub-frame 203 as disclosed in the detailed description of FIG. 7. The first sub-frame 201 and the second sub-frame 202 accommodate selective ephemeris data, and the third sub-frame 203 of one of the satellites of the constellation accommodates coordinated universal time (UTC) data and ionospheric data, which appear once in 18 seconds from the constellation.

The signal generation system configures the third sub-frame 203 to accommodate a text message comprising the ionospheric data and the UTC data. The text message is represented as MT(n, m), where "n" is the type of text message supported as exemplarily illustrated in FIG. 4, and "m" varies from 1 to 14, that is, fourteen different types of a text message are supported, which signifies specific transmission slots in either frequency. The satellites of a seven-satellite constellation operate in a dual frequency band, that is, over a first carrier frequency and a second carrier frequency, for example, L5 frequency and S1 frequency. As exemplarily illustrated in FIG. 8, slots 1 to 7 correspond to the satellite vehicle identification (ID) numbers 1 to 7 of the satellites operating in the L5 frequency, and slots 8 to 14 correspond to satellite vehicle ID numbers 1 to 7 of the satellites operating in the S1 frequency respectively. The message slotting and sequencing of text messages exemplarily illustrated in FIG. 8 in adopted in either the standard positioning service (SPS) or the restricted service (RES). FIG. 8 exemplarily illustrates sequential sweeping of the text message cyclically across the satellites on each frequency of operation of the SPS or the RES. Specifically, a satellite transmits the text message every 18 seconds. Further, the TSF navigation data structure 200 ensures that the text message is different on each frequency of a particular satellite, which obviates dilution of precision (DOP) issues. Sequencing of text messages similar to SPS is adopted in restricted services as well. The text message slotting exemplarily illustrated in FIG. 8 is generic with respect to a particular text message transmission. For example, the UTC data and the ionospheric data can be transmitted alternatively on either the first carrier frequency or the second carrier frequency to ensure that users using a single frequency obtain ionosphere corrections faster.

Figure 9A:
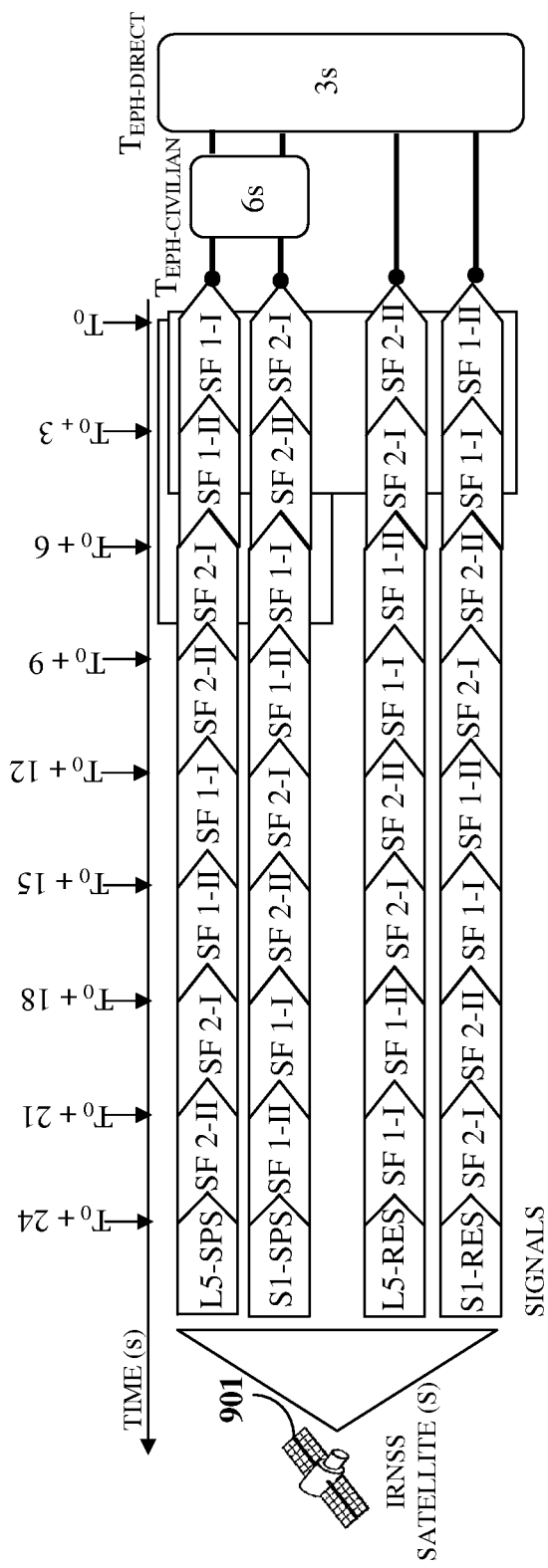
FIG. 9A exemplarily illustrates transmission of navigation data to a satellite navigation receiver operating in the civilian mode of operation.

FIG. 9A exemplarily illustrates transmission of navigation data to a satellite navigation receiver operating in the civilian mode of operation. The transmission of navigation data in the civilian mode of operation follows the method disclosed in the detailed description of FIGS. 7-8. The text message represented as MT(n, m) exemplarily illustrated in FIG. 8 is indicated as "SF 1" and "SF 2" in FIG. 9A, with "SF 1" and "SF 2" carrying the MT(n, m) text message corresponding to its respective slot as shown in FIG. 8. The civilian mode of operation enhances the transmission of the primary navigation data parameters and thus facilitates faster time to first fix (TTFF) in the satellite navigation receiver that supports diverse modes of operation.

Figure 9B:
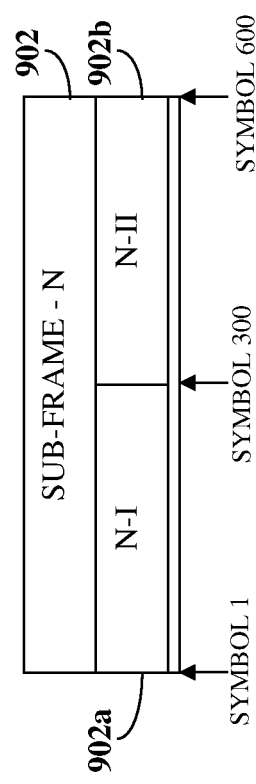
FIG. 9B exemplarily illustrates staggering of navigation data within a sub-frame for reception by a satellite navigation receiver operating in the civilian mode of operation.

The signal generation system generates symbols of the navigation data, herein referred to as "navigation data symbols" as disclosed in the detailed description of FIG. 2. The signal generation system implemented in each satellite 901 staggers the navigation data symbols in each of the sub-frames 201, 202, and 203 of the three sub-frame fixed (TSF)

navigation data structure 200 into a first portion 902a and a second portion 902b exemplarily illustrated in FIG. 9B and as disclosed in the detailed description of FIG. 7. The staggering of a sub-frame, represented as "sub-frame-N" 902 in FIG. 9B, into a first portion 902a and a second portion 902b is accomplished as disclosed in the detailed description of FIG. 9B. Each sub-frame 902 among the sub-frames 201, 202, and 203 exemplarily illustrated in FIG. 2, comprises 600 navigation data symbols. The first three hundred navigation data symbols correspond to the first portion 902a of the sub-frame 902 and the next three hundred navigation data symbols correspond to the second portion 902b of the sub-frame 902. The navigation data symbols are alternated in the next set. The 1200 navigation data symbols of two sub-frame effective navigation data are transmitted in 6 seconds over a first carrier frequency and a second carrier frequency for a standard positioning service (SPS) and a restricted service (RES).

The satellites 901 sequentially transmit the first portion 902a and the second portion 902b of each sub-frame 902 over the first carrier frequency, for example, L5 frequency and the second carrier frequency, for example, S1 frequency in a first mode of service, for example, SPS. A complementary of the first portion 902a and the second portion 902b of each sub-frame 902 are sequentially transmitted over the second carrier frequency and the first carrier frequency in a second mode of service, for example, RES. For example, for the SPS mode of service at time instance "$T_0$", the first carrier frequency, for example, L5 frequency and the second carrier frequency, for example, S1 frequency, are initialized with the first portion 902a of the first sub-frame 201 and the first portion 902a of the second sub-frame 202 respectively. At time instance "$T_0+3$", the first carrier frequency, for example, L5 frequency and the second carrier frequency, for example, S1 frequency, are initialized with the second portion 902b of the first sub-frame 201 and the second portion 902b of the second sub-frame 202 respectively. That is, at time instance "$T_0$", the L5 frequency is initialized with "SF 1-I" and the S1 frequency is initialized with "SF 2-I", and at time instance "$T_0+3$", the L5 frequency is initialized with "SF 1-II" and the S1 frequency is initialized with "SF 2-II" as exemplarily illustrated in FIG. 9A.

The complementary portions 902a and 902b of the first sub-frame 201 and the second sub-frame 202 are assigned to the RES mode of service on the first carrier frequency and the second carrier frequency. For example, at time "$T_0$", the complementary portion of the second sub-frame 202, that is, "SF 2-II" is assigned to L5 frequency and the complementary portion of the first sub-frame 201, that is, "SF 1-II" is assigned to S1 frequency as exemplarily illustrated in FIG. 9A. This method allows the portions 902a and 902b of the first sub-frame 201 and the second sub-frame 202 to be transmitted to the satellite navigation receiver from the L5 frequency and the S1 frequency for the SPS mode of service and the RES mode of service in 6 seconds. Therefore, the satellite navigation receiver can collect the navigation data in a reduced time of 6 seconds, thereby reducing the time to first fix (TTFF). For ($T_0+3$) seconds to ($T_0+6$) seconds, the above sequence is reversed across the modes of service and carrier frequencies.

On either carrier frequency of both modes of service, the satellites 901 transmit the navigation data as exemplarily illustrated in FIG. 9A, where the carrier diversity of SPS and restricted services is met individually. This is accomplished by alternating the sub-frames on either carrier frequency. The above streaming methodology is applicable on all the seven satellites 901 independently. For the slot corresponding to the text message, commensurate navigation data, for example, any textual message is transmitted. This is applicable for only one satellite 901. The remaining satellites 901 transmit the primary navigation data. The satellite navigation receiver operation in a single frequency of operation is unaffected by this method of navigation data transmission. In this method, in real time directly from the satellites 901, the cold start TTFF performance of the satellite navigation receiver is equal to the hot start performance of the global positioning system (GPS) or the assisted global positioning system (AGPS) ephemeris assistance. As used herein, the term "cold start" refers to the state of the satellite navigation receiver, where the satellite navigation receiver is powered on without any prior information. Also, as used herein, the term "hot start" refers to the state of the satellite navigation receiver, where the satellite navigation receiver has access to the latest navigation data, for example, ephemeris data, either stored in a memory from the last power-on, or from an external real time aid. Furthermore, this method can be used in any emerging dual frequency global navigation satellite system (GNSS).

FIG. 9B exemplarily illustrates staggering of navigation data within a sub-frame 902 for reception by a satellite navigation receiver operating in the civilian mode of operation. The navigation data symbols generated by the signal generation system are staggered and transmitted from the satellites 901 of the seven-satellite constellation. Each sub-frame 902 of the navigation data structure accommodates 600 navigation data symbols. For example, in the navigation data structure 200 exemplarily illustrated in FIG. 2, the first sub-frame 201 comprises 600 symbols, the second sub-frame 202 comprises 600 navigation data symbols, and the third sub-frame 203 comprises 600 navigation data symbols. Each sub-frame 902 of the navigation data structure is staggered into two portions "N-I" 902a and "N-II" 902b as exemplarily illustrated in FIG. 9B, where the first portion "N-I" 902a accommodates 300 navigation data symbols from 1 to 300 and the second portion "N-II" 902b accommodates 300 navigation data symbols from 301 to 600. The transmission of the staggered navigation data is exemplarily illustrated in FIG. 9A and is disclosed in the detailed description of FIG. 9A.

Figure 10:
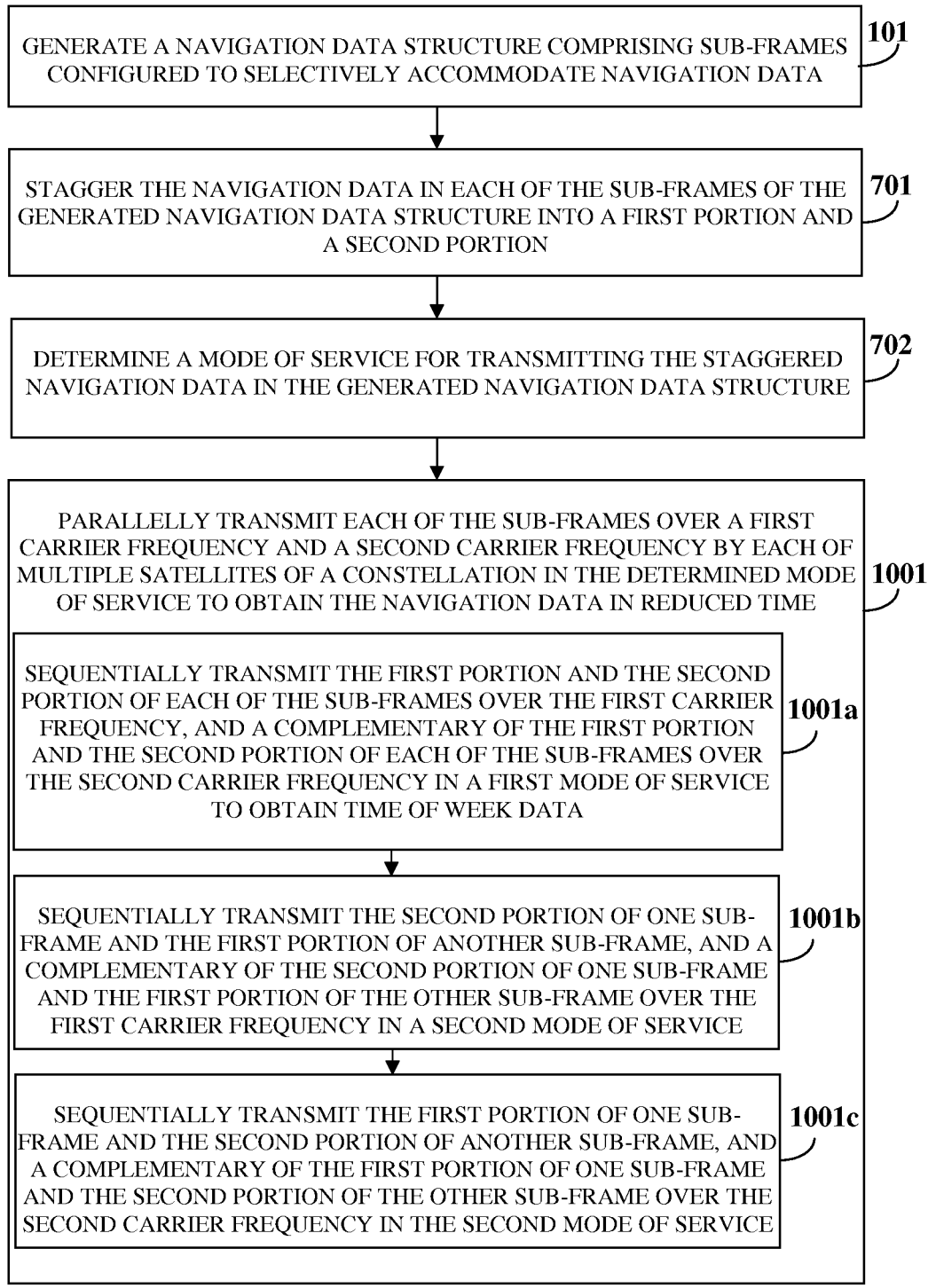
FIG. 10 illustrates a method for reducing time to first fix in a satellite navigation receiver operating in a restricted mode of operation.

FIG. 10 illustrates a method for reducing time to first fix (TTFF) in a satellite navigation receiver operating in a restricted mode of operation. The TTFF achievable on a restricted service (RES) should be better or equal to that of a standard positioning service (SPS). The signal generation system generates 101 a navigation data structure 200 comprising sub-frames 201, 202, and 203 exemplarily illustrated in FIG. 2, configured to selectively accommodate navigation data as disclosed in the detailed description of FIG. 5. The signal generation system generates a navigation data signal from the navigation data structure 200 that assumes the navigation data on the RES is different from the navigation data on the SPS and the following assumptions are made. The acquisition of the navigation data signal is SPS assisted, that is, restricted only to obtaining time for restricted signal acquisition. The first impediment in achieving a fast TTFF for a restricted user is the time taken to collect time of week (TOW) information which takes a minimum of 6 seconds as disclosed in the co-pending non-provisional patent application number 4230/CHE/2011 titled "Satellite Navigation System for Optimal Time to First Fix Using Code and Carrier Diversity" in the Indian regional navigational satellite system (IRNSS) signal design. In the diverse mode of satellite navigation receiver operation, the method disclosed herein reduces TOW.

In this method, selective ephemeris data, ionospheric data, coordinated universal time (UTC) data, textual data, and any combination thereof constitute the navigation data as disclosed in the detailed description of FIG. 5. The configuration of the sub-frames 201, 202, and 203 in the navigation data structure 200 reduces time for collecting the navigation data by the satellite navigation receiver. The signal generation system staggers 701 the navigation data in each of the sub-frames 201, 202, and 203 of the generated navigation data structure 200 into a first portion and a second portion as disclosed in the detailed description of FIG. 7 and as exemplarily illustrated in FIG. 11B. In an embodiment, the signal generation system determines 702 a mode of service, for example, a standard positioning service (SPS), a restricted service (RES), etc., for transmitting the staggered navigation data as disclosed in the detailed description of FIG. 7. Each of the satellites of a constellation implementing the signal generation system parallelly transmits 1001 each of the sub-frames 201, 202, and 203 over a first carrier frequency, for example, L5 frequency, and a second carrier frequency, for example, S1 frequency, in the determined mode of service to obtain the navigation data in reduced time, thereby reducing the TTFF in the satellite navigation receiver in the restricted mode of operation.

Figure 11A:
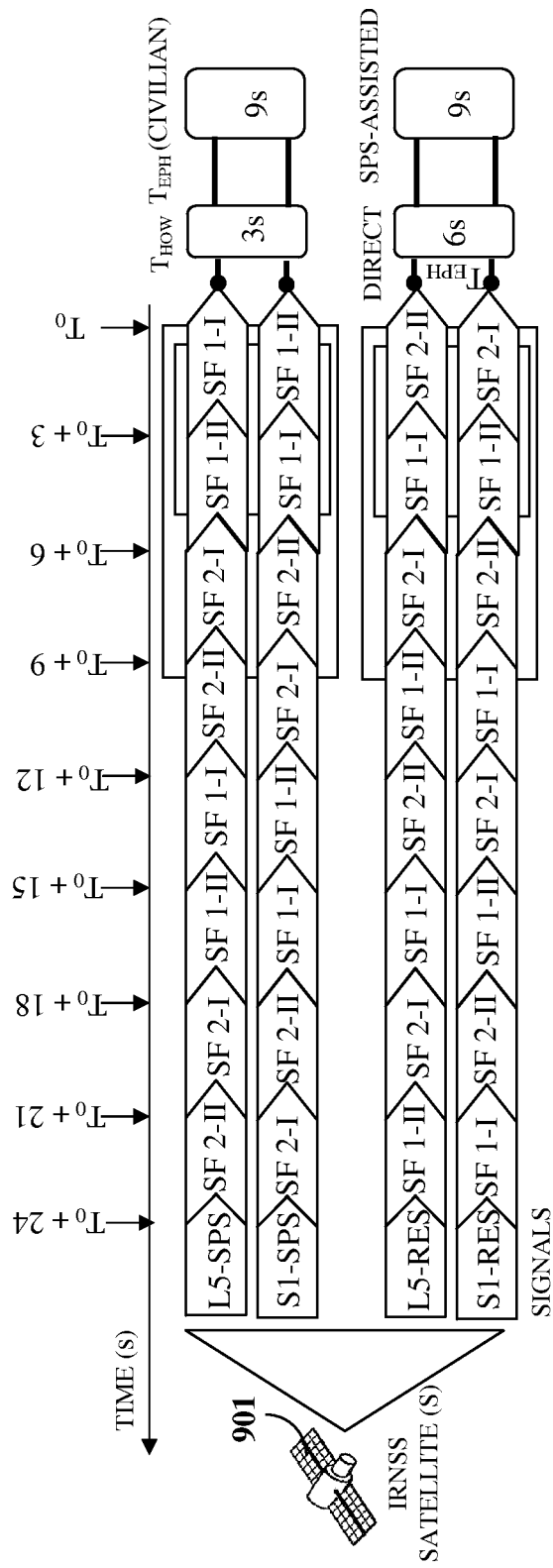
FIG. 11A exemplarily illustrates transmission of navigation data to a satellite navigation receiver operating in the restricted mode of operation.

During parallel transmission, the signal generation system sequentially transmits 1001a the first portion and the second portion of each of the sub-frames 201, 202, and 203 over the first carrier frequency, for example, L5 frequency, and a complementary of the first portion and the second portion of each of the sub-frames 201, 202, and 203 over the second carrier frequency, for example, S1 frequency, in a first mode of service, for example, the SPS mode of service to obtain time of week (TOW) data as exemplarily illustrated in FIG. 11A. The signal generation system sequentially transmits 1001b the second portion of one sub-frame, for example, SF 2 and the first portion of another sub-frame, for example, SF 1 exemplarily illustrated in FIG. 11A, and a complementary of the second portion of one sub-frame and the first portion of the other sub-frame over the first carrier frequency, for example, L5 frequency in a second mode of service, for example, the RES mode of service. The signal generation system sequentially transmits 1001c the first portion of one sub-frame, for example, SF 2 and the second portion of another sub-frame, for example, SF 1 exemplarily illustrated in FIG. 11A, and a complementary of the first portion of one sub-frame and the second portion of the other sub-frame over the second carrier frequency, for example, S1 frequency in the second mode of service, for example, the RES mode of service. The first mode of service assists the second mode of service for availing the obtained TOW data in reduced time, thereby reducing the TTFF in the satellite navigation receiver. The difference between the civilian mode of operation and the restricted mode of operation is that the time required to collect the TOW is reduced in the restricted mode of operation, by straddling the navigation data in an opposite direction on the SPS channel, which reduces the time required to acquire the RES signal.

FIG. 11A exemplarily illustrates transmission of navigation data to a satellite navigation receiver operating in the restricted mode of operation. The transmission of navigation data in the restricted mode of operation follows the method disclosed in the detailed description of FIG. 10. The text message represented as MT(n, m) exemplarily illustrated in FIG. 8 is indicated as "SF 1" and "SF 2" in FIG. 11A with "SF 1" and "SF 2" carrying the MT(n, m) text message corresponding to its respective slot as exemplarily in FIG. 8. The signal generation system generates symbols of the navigation data, herein referred to as "navigation data symbols" as disclosed in the detailed description of FIG. 2. The signal generation system implemented in each satellite 901 staggers the navigation data symbols in each of the sub-frames 201, 202, and 203 of the three sub-frame fixed (TSF) navigation data structure 200 exemplarily illustrated in FIG. 2, into a first portion 902a and a second portion 902b exemplarily illustrated in FIG. 11B, as disclosed in the detailed description of FIG. 7. The staggering of a sub-frame 902, represented as "sub-frame-N" 902 in FIG. 11B, into a first portion 902a and a second portion 902b is accomplished as disclosed in the detailed description of FIG. 11B. Each sub-frame 902 among the sub-frames 201, 202, and 203 exemplarily illustrated in FIG. 2, comprises 600 navigation data symbols and the two sub-frame effective navigation data is 1200 symbols that are transmitted parallelly over a first carrier frequency and a second carrier frequency for the standard positioning service (SPS) and the restricted service (RES) as disclosed in the detailed description of FIG. 10. The slotting of the sub-frames 201, 202, and 203 on the first carrier frequency, for example, the L5 frequency and the second carrier frequency, for example, the S1 frequency and the SPS mode of service and RES mode of service is exemplarily illustrated in FIG. 11A.

The sub-frames on the first carrier frequency and the second carrier frequency in the SPS mode of service and the RES mode of service are identical. For example, the L5 frequency and the S1 frequency in the SPS mode of service transmit the first sub-frame 201 of the navigation data structure 200 as exemplarily illustrated in FIG. 11A. However, the navigation data is straddled either on the first carrier frequency or the second carrier frequency of the SPS mode of service to ensure that time of week (TOW) is available within 3 seconds. This is accomplished by splitting the sub-frame 902 of S1 carrier frequency of the SPS mode of service as exemplarily illustrated in FIG. 11B, where the navigation data is split into two portions 902a and 902b and transmitted in opposite directions on two carrier frequencies. The sub-frames 201, 202, and 203 are straddled on the first carrier frequency and the second carrier frequency of the RES mode of service, that is, assuming different navigation data with respect to the SPS mode of service, and thus ensure a time to first fix (TTFF) of 9 seconds including 3 seconds for collection of TOW data. If the data rate of a restricted navigation signal in a RES mode of service is increased to enable the faster transmission of primary navigation data parameters, the method disclosed herein assists the collection of TOW faster, that is, the RES mode of service is assisted by the SPS mode of service. With TOW as a pointer, a lock on the RES signal is established.

In an example of this method, for the SPS mode of service, at time instance "$T_0$", the first carrier frequency, for example, L5 frequency and the second carrier frequency, for example, S1 frequency, are initialized with the first portion 902a of the first sub-frame 201 and the second portion 902b of the first sub-frame 201 respectively. At time instance "$T_0+3$", the first carrier frequency, for example, L5 frequency and the second carrier frequency, for example, S1 frequency, are initialized with the second portion 902b of the first sub-frame 201 and the first portion 902a of the first sub-frame 201 respectively. That is, at time instance "$T_0$", the L5 frequency is initialized with "SF 1-I" and the S1 frequency is initialized with "SF 1-II", and at time instance "$T_0+3$", the L5 frequency is initialized with "SF 1-II" and the S1 frequency is initialized with "SF 1-I" as exemplarily illustrated in FIG. 11A. For the RES mode of service, at time instance "$T_0$", the first carrier frequency, for example, L5 frequency and the second carrier frequency, for example, S1 frequency, are initialized with the second portion 902b of the second sub-frame 202 and the first portion 902a of the second sub-frame 202 respectively. At time instance "$T_0+3$", the first carrier frequency, for example, L5 frequency and the second carrier frequency, for example, S1 frequency, are initialized with the first portion 902a of the first sub-frame 201 and the second portion 902b of the first sub-frame 201 respectively. That is, at time instance "$T_0$", the L5 frequency is initialized with "SF 2-II" and the S1 frequency is initialized with "SF 2-I", and at time instance "$T_0+3$", the L5 frequency is initialized with "SF 1-I" and the S1 frequency is initialized with "SF 1-II" as exemplarily illustrated in FIG. 11A.

Figure 11B:
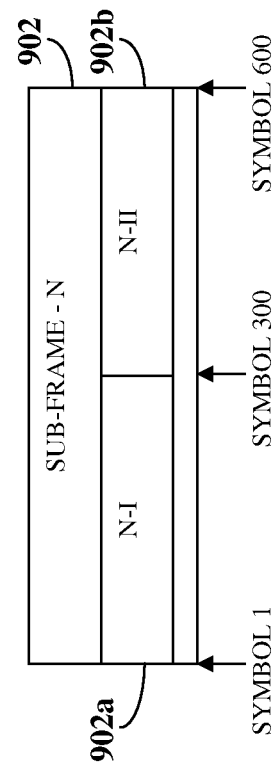
FIG. 11B exemplarily illustrates staggering of navigation data within a sub-frame for reception by a satellite navigation receiver operating in the restricted mode of operation.

FIG. 11B exemplarily illustrates staggering of navigation data within a sub-frame 902 for reception by a satellite navigation receiver operating in the restricted mode of operation. The navigation data symbols generated by the signal generation system are staggered and transmitted from the satellites 901 of the seven-satellite constellation. Each sub-frame 902 of the navigation data structure accommodates 600 navigation data symbols. That is, in the navigation data structure 200 exemplarily illustrated in FIG. 2, the first sub-frame 201 comprises 600 navigation data symbols, the second sub-frame 202 comprises 600 navigation data symbols, and the third sub-frame 203 comprises 600 navigation data symbols. Each sub-frame 902 of the navigation data structure is staggered into two portions "N-I" 902a and "N-II" 902b as exemplarily illustrated in FIG. 11B, where the first portion "N-I" 902a accommodates 300 navigation data symbols from 1 to 300 and the second portion "N-II" 902b accommodates 300 navigation data symbols from 301 to 600. The transmission of the staggered navigation data is exemplarily illustrated in FIG. 11A and is disclosed in the detailed description of FIG. 11A.

Figure 12:
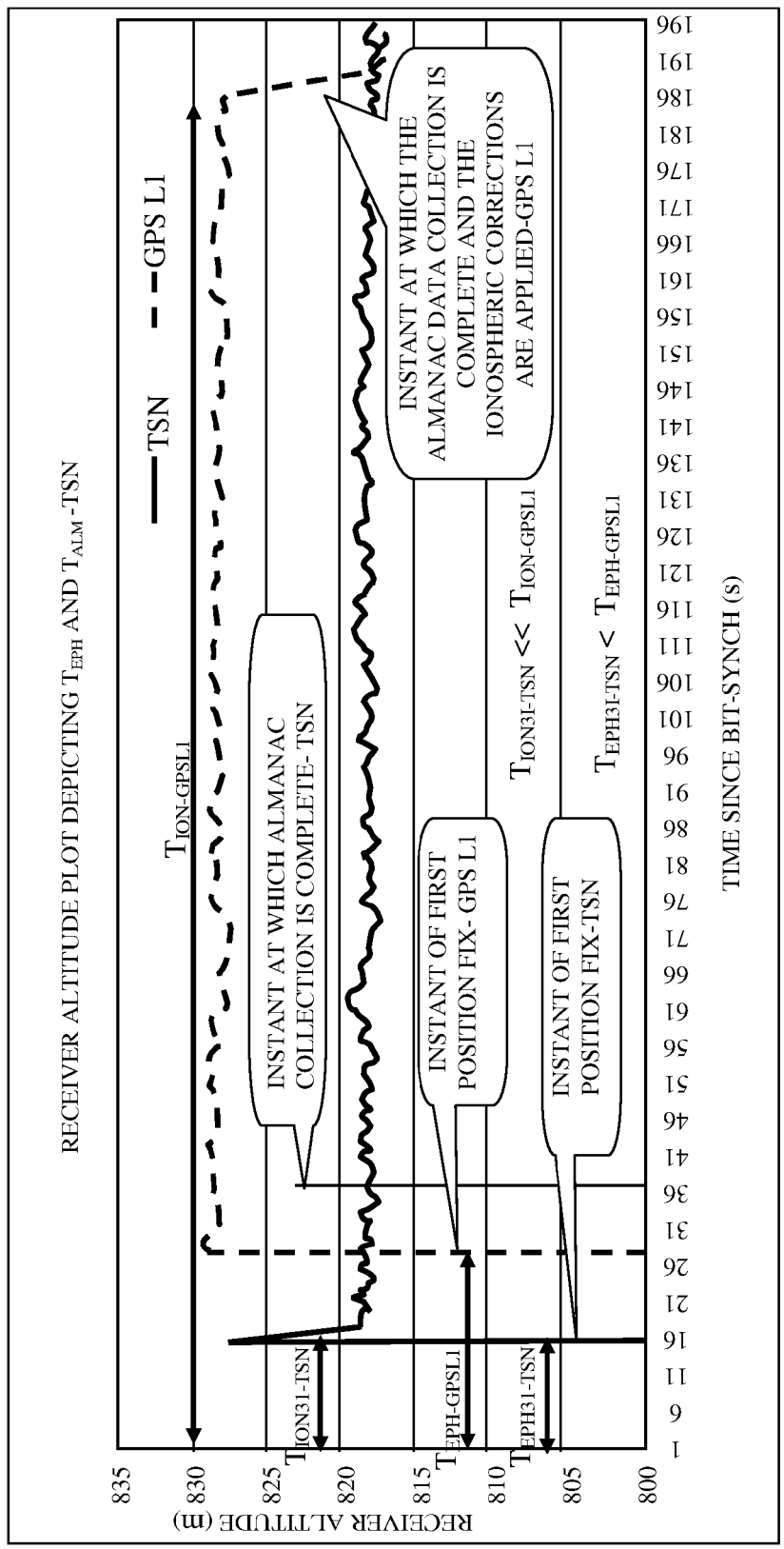
FIG. 12 illustrates a graphical representation showing a comparative analysis of collection time of ephemeris data and almanac data determined using the three sub-frame normal navigation data structure based system and a global positioning system based system.

FIG. 12 illustrates a graphical representation showing a comparative analysis of collection time of ephemeris data and almanac data determined using the three sub-frame normal (TSN) navigation data based system and a global positioning system (GPS) based system. An altitude plot depicting the time required by the satellite navigation receiver for estimating the altitude of the user is selected to obtain an understanding of the effect of the navigation data structure 200 exemplarily illustrated in FIG. 2 on the time for collecting the navigation data by the satellite navigation receiver. The altitude plot enables testing of the relative performance in terms of the time to first fix (TTFF) using the method and system disclosed herein based on the three sub-frame normal (TSN) navigation data structure 200 when compared to a conventional GPS based system. To test the relative performance, the operation of the satellite navigation receiver is tested independently. In a first version, the three sub-frame normal (TSN) navigation data structure 200 is simulated by the signal generation system and the performance of the satellite navigation receiver is tested accordingly. In a second version, navigation data according to the five sub-frame navigation data structure 200 is generated and the satellites with the generated navigation data are tested. The TTFF from both the versions is logged for several runs and displayed using a graphical user interface. As exemplarily illustrated in FIG. 12, there is an improvement in the TTFF performance and the time required to collect the almanac data or the text message based on the TSN navigation data structure 200 in comparison with GPS.

Figure 13:
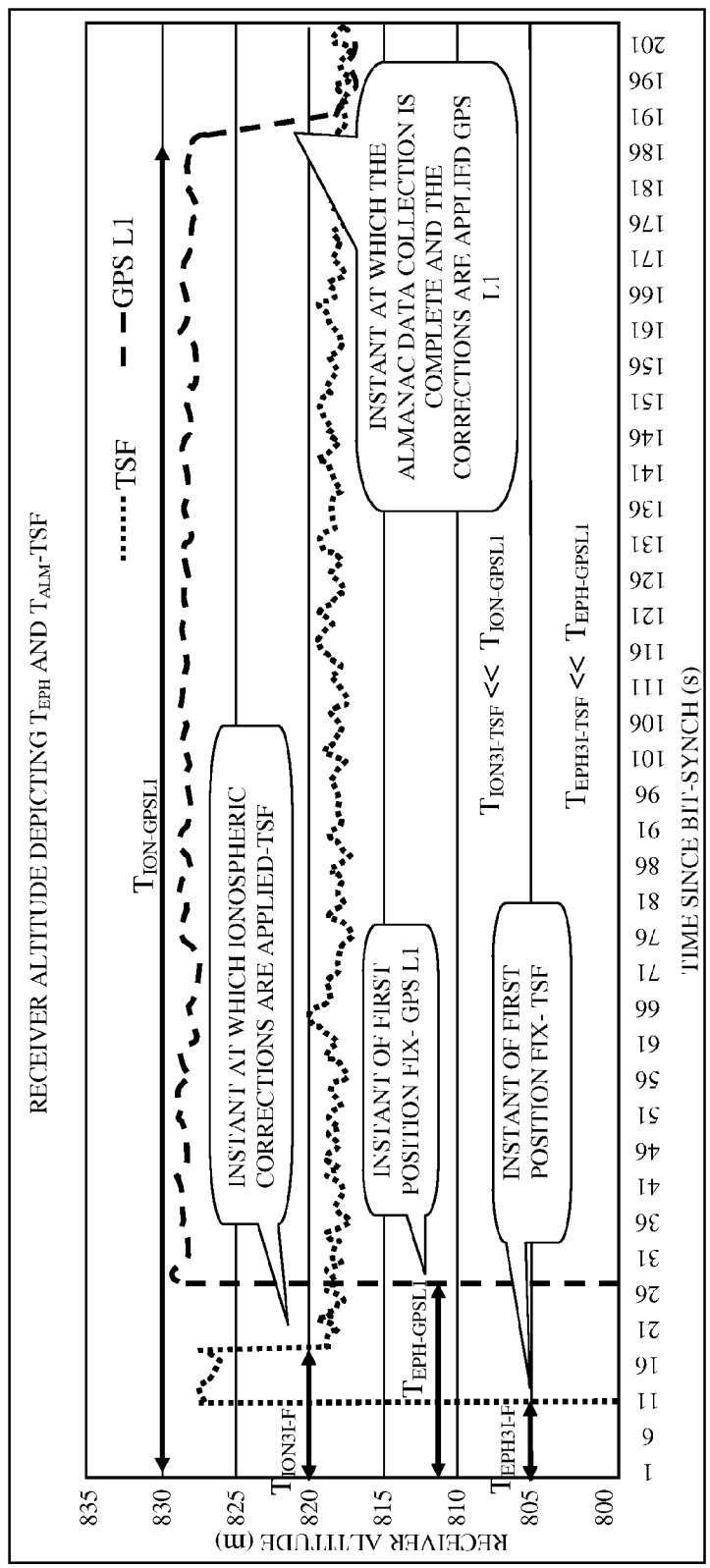
FIG. 13 illustrates a graphical representation showing a comparative analysis of collection time of ephemeris data and almanac data determined using the three sub-frame fixed navigation data structure based system and a global positioning system based system.

FIG. 13 illustrates a graphical representation showing a comparative analysis of collection time of ephemeris data and almanac data determined using the three sub-frame fixed (TSF) navigation data based system and a global positioning system (GPS) based system. An altitude plot depicting the time required by the satellite navigation receiver for estimating the altitude of the user is selected to obtain an understanding of the effect of the navigation data structure 200 exemplarily illustrated in FIG. 2 disclosed herein, on the time for collecting the ephemeris data and the almanac data by the satellite navigation receiver. The altitude plot enables testing of the relative performance in terms of the time to first fix (TTFF) using the method and system disclosed herein based on three sub-frame fixed (TSF) navigation data structure 200 when compared to the conventional GPS based system. To test the relative performance, the operation of the satellite navigation receiver is tested independently. In a first version, the three sub-frame fixed (TSF) navigation data structure 200 is simulated by the signal generation system and the performance of the satellite navigation receiver is tested accordingly. In a second version, navigation data according to the five sub-frame navigation data structure 200 is generated and the satellites with the generated navigation data are tested. The TTFF from both the versions is logged for several runs and displayed using a graphical user interface. As exemplarily illustrated in FIG. 13, there is an improvement in the TTFF performance and the time required to collect almanac data or the text message of the TSF navigation data structure 200 in comparison with GPS.

FIG. 14 illustrates a table showing a comparison of the three sub-frame normal (TSN) navigation data structure 200 and the three sub-frame fixed (TSF) navigation data structure 200 exemplarily illustrated in FIG. 2, with a global positioning system (GPS) based system. The testing of the relative performance of a satellite navigation receiver in terms of the time to first fix (TTFF) using the method and system disclosed herein based on the TSN navigation data structure 200 and the TSF navigation data structure 200 when compared to the conventional GPS based system is as disclosed in the detailed description of FIGS. 12-13. The assumptions made in case of the TSF navigation data structure 200 is that the text messages are restricted to coordinated universal time (UTC) data and ionospheric data. The ephemeris time $T_{eph}$ and the TTFF achieved using the method and system disclosed herein based on the TSN navigation data structure 200 is a 40% improvement over the ephemeris time $T_{eph}$ and the TTFF achieved using the conventional GPS based system. The ephemeris time $T_{eph}$ and the TTFF achieved using the method and system disclosed herein based on the TSF navigation data structure 200 is a 60% improvement over the ephemeris time $T_{eph}$ and the TTFF achieved using the conventional GPS based system. The time required to transmit textual data or the almanac data denoted as "$T_{text\ message}/T_{alm}$" achieved using the method and system disclosed herein based on the TSN navigation data structure 200 is a 82% improvement over the time required to transmit the textual data or the almanac data achieved using the conventional GPS based system. Furthermore, global extension of the Indian regional navigational satellite system (IRNSS) with the TSN navigation data structure 200 and the TSF navigation data structure 200 is also possible.

FIG. 15 illustrates a table showing the time to first fix (TTFF) for a satellite navigation receiver operating in a civilian mode of operation in a single carrier frequency as well as a dual carrier frequency. The TTFF achieved over a single carrier frequency, for example, L5 frequency or S1 frequency, operation of the satellite navigation receiver for the standard positioning service (SPS) and a restricted service (RES) is 12 seconds. The transmission of primary navigation data parameters, that is, the ephemeris data is optimal from either the L5 frequency or S1 frequency for a SPS user, which is the TTFF of restricted users assuming the navigation data of the SPS mode of service and the RES mode of service is the same. The TTFF achieved over a dual carrier frequency, for example, L5 frequency and S1 frequency, operation of the satellite navigation receiver for the SPS mode of service and the RES mode of service is 6 seconds. The data from the L5 frequency or the S1 frequency paths effectively enables the SPS receiver to achieve an optimal TTFF. With time of week (TOW), the RES mode of service enters into a measurement mode and provides instantaneous positioning with navigation data obtained from the SPS path.

FIG. 16 illustrates a table showing the time to first fix (TTFF) for a satellite navigation receiver operating in a restricted mode of operation in a single carrier frequency as well as a dual carrier frequency. The TTFF achieved over a single carrier frequency, for example, L5 frequency or S1 frequency, operation of the satellite navigation receiver for standard positioning service (SPS) is 12 seconds. The transmission of the primary navigation data parameters, that is, the ephemeris data is identical and thus TTFF from either L5 frequency or S1 frequency remains the same. The TTFF achieved over a single carrier frequency, for example, L5 frequency or S1 frequency, operation of the satellite navigation receiver for restricted service (RES) is 18 seconds. With the navigation data being different for RES mode of service, code diversity disclosed in the co-pending non-provisional patent application number 4230/CHE/2011 titled "Satellite Navigation System for Optimal Time to First Fix Using Code and Carrier Diversity" is not applicable and thus with SPS assistance, the TTFF follows restricted users for a single carrier frequency.

The TTFF achieved over a dual-carrier frequency, for example, L5 frequency and S1 frequency, operation of the satellite navigation receiver for SPS mode of service and RES mode of service is 9 seconds. For a civilian mode of operation of the satellite navigation receiver, the navigation data from L5 frequency and S1 frequency when processed effectively results in a TTFF of 9 seconds. With TOW data available in 3 seconds as disclosed in the detailed description of FIG. 11A, the TTFF achievable for the restricted users in the SPS assisted mode with different navigation data is 9 seconds, that is, 3 seconds to acquire the RES signal and 6 seconds to obtain the navigation data containing the ephemeris data, which is optimal from SPS assisted and different data architecture.

Figure 17:
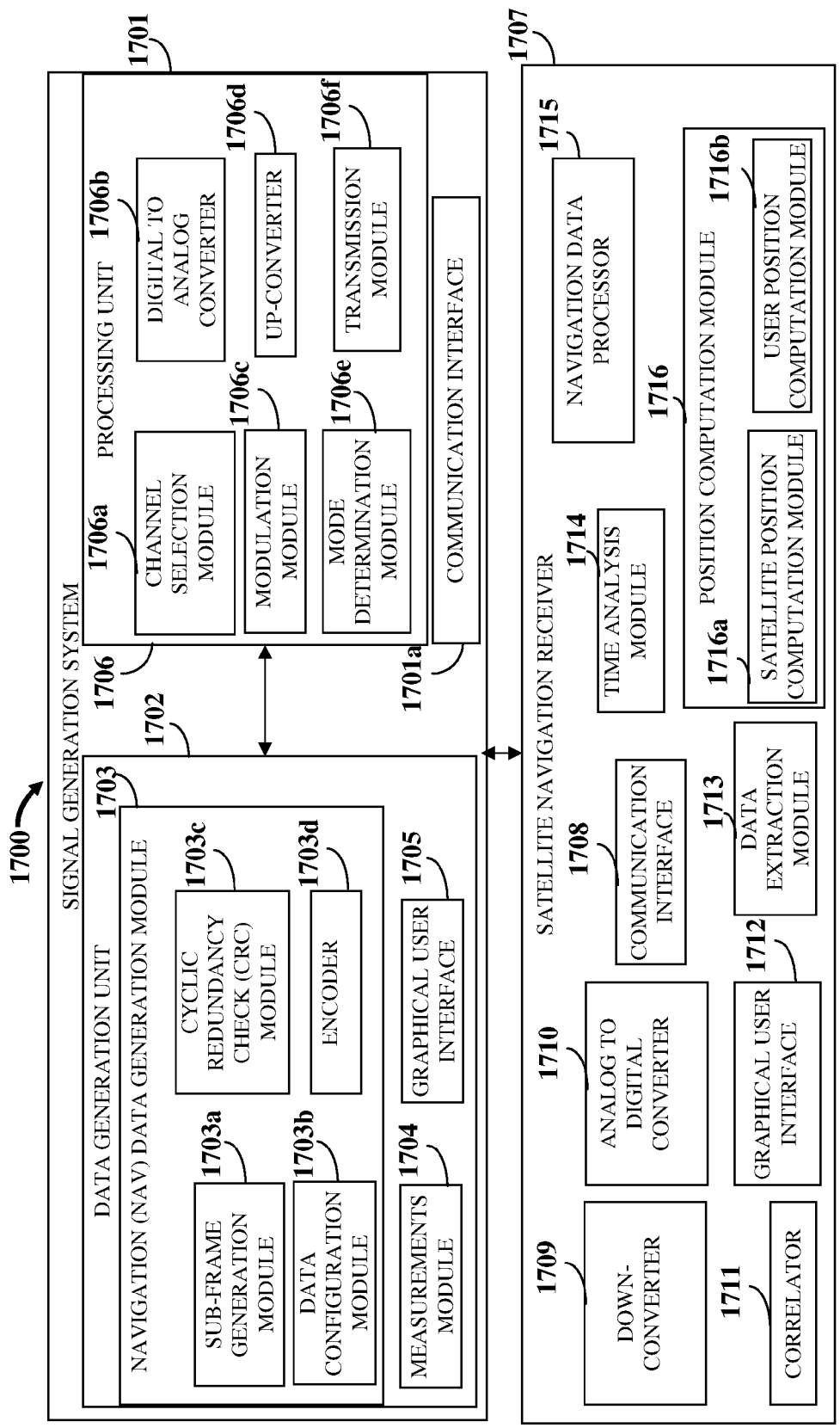
FIG. 17 exemplarily illustrates a system for selectively transmitting navigation data to a satellite navigation receiver for reducing time to first fix in the satellite navigation receiver.

FIG. 17 exemplarily illustrates a system 1700 for selectively transmitting navigation data to a satellite navigation receiver 1707 for reducing time to first fix (TTFF) in the satellite navigation receiver 1707. The system 1700 disclosed herein comprises a signal generation system 1701 that generates a navigation signal, for example, a radio frequency navigation signal that enables reduction of TTFF in the satellite navigation receiver 1707. The signal generation system 1701 is implemented in each satellite of a constellation. The system 1700 disclosed herein further comprises a satellite navigation receiver 1707 that receives the generated radio frequency navigation signal in reduced time, extracts the navigation data from the received radio frequency navigation signal, and processes the extracted navigation data in reduced time, thereby reducing the TTFF in the satellite navigation receiver 1707. The signal generation system 1701 and the satellite navigation receiver 1707 communicate via communication interfaces 1701a and 1708 respectively. The communication interfaces 1708 and 1701a are, for example, ports that enable coupling of the satellite navigation receiver 1707 to the signal generation system 1701, for example, via a wired interface such as a radio frequency (RF) cable.

The signal generation system 1701 comprises a data generation unit 1702 and a processing unit 1706. The data generation unit 1702 generates navigation data and measurements. The data generation unit 1702 of the signal generation system 1701 comprises a measurements module 1704 and a navigation data generation module 1703. The measurements module 1704 generates characteristic measurements comprising, for example, pseudorange measurements and delta-range measurements of each satellite of a constellation. In an embodiment, the data generation unit 1702 further comprises a graphical user interface (GUI) 1705 that profiles navigation data measurements, health measurements of a satellite, etc. The navigation data generation module 1703 generates a navigation data structure 200 as exemplarily illustrated in FIG. 2. The navigation data structure 200 comprises a first sub-frame 201 and a second sub-frame 202 configured to accommodate selective ephemeris data of the navigation data, and a third sub-frame 203 configured to accommodate a text message comprising almanac data, ionospheric data, coordinated universal time (UTC) data, textual data, and any combination thereof as disclosed in the detailed description of FIG. 1.

The navigation data generation module 1703 comprises a sub-frame generation module 1703a, a data configuration module 1703b, a cyclic redundancy check (CRC) module 1703c, and an encoder 1703d. The sub-frame generation module 1703a generates sub-frames, that is, the first sub-frame 201, the second sub-frame 202, and the third sub-frame 203 of the navigation data structure 200 that selectively accommodate the selective ephemeris data, and the text message extrapolated from preconfigured navigation data files associated with each satellite. The preconfigured navigation data files comprise, for example, almanac files that store coarse orbital parameters and status information of the satellite, ephemeris files that store orbital and clock correction parameters for each satellite, etc. The sub-frame generation module 1703a further appends a synchronization word 208 to each of the first sub-frame 201, the second sub-frame 202, and the third sub-frame 203 as exemplarily illustrated in FIG. 2. The synchronization word 208 is configured to enable frame synchronization and identification of a sub-frame boundary of each of the first sub-frame 201, the second sub-frame 202, and the third sub-frame 203.

The data configuration module 1703b configures the navigation data in each of the sub-frames 201, 202, and 203 of the generated navigation data structure 200. In the civilian mode of operation and the restricted mode of operation, the data configuration module 1703b selectively groups the almanac data, the ionospheric data, and the coordinated universal time (UTC) data. Furthermore, in the civilian mode of operation and the restricted mode of operation, the data configuration module 1703b staggers the navigation data in each of the sub-frames 201, 202, and 203 of the generated navigation data structure 200 into a first portion 902a and a second portion 902b as exemplarily illustrated in FIG. 9B. In the civilian mode of operation, the data configuration module 1703b sequentially sweeps the textual data cyclically across satellites on each of a first carrier frequency and a second carrier frequency in a first mode of service or a second mode of service. The cyclic redundancy check module 1703c verifies integrity of the navigation data by computing cyclic redundancy check bits for each of the first sub-frame 201, the second sub-frame 202, and the third sub-frame 203 of the generated navigation data structure 200 for determining accuracy of the navigation data. The encoder 1703d applies a forward error correcting code to the navigation data for encoding each of the first sub-frame 201, the second sub-frame 202, and the third sub-frame 203, and generating symbols of the navigation data.

The processing unit 1706 of the signal generation system 1701 processes the generated navigation data structure 200 comprising the selective ephemeris data, the almanac data, the ionospheric data, the coordinated universal time (UTC) data, and the textual data, to generate, for example, a radio frequency (RF) navigation signal. The processing unit 1706 comprises a transmission module 1706f for transmitting the generated navigation signal to the satellite navigation receiver 1707 via the communication interface 1701a in reduced time, thereby reducing the TTFF in the satellite navigation receiver 1707.

The processing unit 1706 further comprises a channel selection module 1706a, a digital to analog converter 1706b, a modulation module 1706c, an up-converter 1706d, and a mode determination module 1706e. The channel selection module 1706a selects a satellite channel that is associated with a satellite. The modulation module 1706c generates a carrier frequency and a ranging code, for example, a pseudorandom number (PRN) code for a satellite channel associated with a satellite, over which the generated navigation signal is to be transmitted. The ranging code is an identifier that is transmitted from the satellite to the satellite navigation receiver 1707 using which the satellite navigation receiver 1707 can determine the amount of transmission time that a navigation signal takes to reach the satellite navigation receiver 1707. The ranging code can be used to determine the approximate distance between the satellite and the satellite navigation receiver 1707. The modulation module 1706c performs an exclusive OR (EXOR) operation between the bits of the navigation data structure 200 and the ranging code received from the satellite.

The modulation module 1706c modulates the navigation data in the generated navigation data structure 200 received from the data generation unit 1702, with the generated carrier frequency and the generated ranging code for generating an intermediate frequency (IF) signal. In an example, the modulation module 1706c modulates the EXORed navigation data onto the generated carrier frequency to generate a composite modulated IF signal. The modulation module 1706c uses a digital modulation technique, for example, a binary phase shift keying (BPSK) modulation technique and generates digital samples. The digital to analog converter 1706b converts the digital samples to an intermediate frequency (IF) signal. The up-converter 1706d translates the IF signal to generate the radio frequency navigation signal.

The mode determination module 1706e determines a mode of operation, for example, a civilian mode of operation, a restricted mode of operation, etc., for transmitting the navigation data in the generated navigation data signal. The mode determination module 1706e further determines a mode of service, for example, a standard positioning service (SPS), a restricted service, etc., for transmitting the staggered navigation data in the generated navigation data structure 200.

The transmission module 1706f selectively transmits the configured navigation data in the generated navigation data structure 200 to the satellite navigation receiver 1707 in reduced time, thereby reducing the TTFF in the satellite navigation receiver 1707. In an embodiment, the transmission module 1706f selectively transmits the ephemeris data, the selectively grouped almanac data, ionospheric data, and coordinated universal time (UTC) data, and the textual data in the generated navigation data structure 200 to the satellite navigation receiver 1707. In another embodiment, the transmission module 1706f alternatively transmits the ionospheric data and the UTC data with the almanac data and free of the almanac data in the third sub-frame 203 in the generated navigation data structure 200 to transmit the navigation data in reduced time, thereby reducing the TTFF in the satellite navigation receiver 1707. In another embodiment, the transmission module 1706f simultaneously and selectively transmits the selective ephemeris data, the selectively grouped almanac data, the ionospheric data, and the UTC data, and the textual data in the generated navigation data structure 200 to the satellite navigation receiver 1707, thereby allowing the satellite navigation receiver 1707 to collectively receive the selective ephemeris data, the almanac data, the ionospheric data, the UTC data, and the textual data in reduced time, thereby further reducing the TTFF in the satellite navigation receiver 1707.

In another embodiment, the transmission module 1706f, in communication with the mode determination module 1706e, is configured to transmit the ephemeris data, the ionospheric data, and the coordinated universal time (UTC) data free of the almanac data in the generated navigation data structure 200 to the satellite navigation receiver 1707 in the determined mode of operation, thereby reducing the TTFF in the satellite navigation receiver 1707. The ionospheric data and the UTC data are transmitted by one of multiple satellites of a constellation to the satellite navigation receiver 1707. In another embodiment, the transmission module 1706f alters transmission of the navigation data after the transmission of the ionospheric data and the UTC data to further reduce the TTFF in the satellite navigation receiver 1707.

In the civilian mode of operation, the transmission module 1706f parallelly transmits each of the sub-frames 201, 202, and 203 comprising distinct staggered navigation data over a first carrier frequency, for example, L5 frequency, and a second carrier frequency, for example, S1 frequency, in the determined mode of service to obtain the navigation data in reduced time, thereby reducing the TTFF in the satellite navigation receiver 1707. In the civilian mode of operation, the transmission module 1706f sequentially transmits the first portion 902a and the second portion 902b of each of the sub-frames 201, 202, and 203 over the first carrier frequency, for example, L5 frequency and the second carrier frequency, for example, S1 frequency, in a first mode of service as exemplarily illustrated in FIG. 9A. Furthermore, in the civilian mode of operation, the transmission module 1706f sequentially transmits a complementary of the first portion 902a and the second portion 902b of each of the sub-frames 201, 202, and 203 over the second carrier frequency and the first carrier frequency in a second mode of service as exemplarily illustrated in FIG. 9A. In an embodiment, the transmission module 1706f in each of multiple satellites transmits distinct staggered navigation data on each of a first carrier frequency, for example, L5 frequency, and a second carrier frequency, for example, S1 frequency. In another embodiment, the transmission module 1706f alternatively transmits the textual data, the ionospheric data, and the coordinated universal time (UTC) data of the navigation data in the sub-frames 201, 202, and 203 on a first carrier frequency, for example, L5 frequency, or a second carrier frequency, for example, S1 frequency.

In the restricted mode of operation, the transmission module 1706f parallelly transmits each of the sub-frames 201, 202, and 203 over a first carrier frequency and a second carrier frequency in a determined mode of service to obtain the navigation data in reduced time, thereby reducing the TTFF in the satellite navigation receiver 1707. In the restricted mode of operation, the transmission module 1706*f* sequentially transmits the first portion 902*a* and the second portion 902*b* exemplarily illustrated in FIG. 11B, of each of the sub-frames 201, 202, and 203 over the first carrier frequency, and a complementary of the first portion 902*a* and the second portion 902*b* of the each of the sub-frames 201, 202, and 203 over the second carrier frequency in a first mode of service to obtain time of week (TOW) data as exemplarily illustrated in FIG. 11A. In the restricted mode of operation, the transmission module 1706*f* sequentially transmits the second portion 902*b* of one sub-frame and the first portion 902*a* of another sub-frame, and a complementary of the second portion 902*b* of one sub-frame and the first portion 902*a* of the other sub-frame over the first carrier frequency in a second mode of service as exemplarily illustrated in FIG. 11A. Furthermore, in the restricted mode of operation, the transmission module 1706*f* sequentially transmits the first portion 902*a* of one sub-frame and the second portion 902*b* of another sub-frame, and a complementary of the first portion 902*a* of one sub-frame and the second portion 902*b* of the other sub-frame over the second carrier frequency in the second mode of service as exemplarily illustrated in FIG. 11A. The first mode of service assists the second mode of service for availing the obtained TOW data in reduced time, thereby reducing the TTFF in the satellite navigation receiver 1707.

The processing unit 1706 of the signal generation system 1701 transmits the radio frequency navigation signal generated by the signal generation system 1701 to the satellite navigation receiver 1707 via the communication interface 1701*a*, for example, using a radio frequency (RF) cable, thereby allowing the satellite navigation receiver 1707 to process the radio frequency navigation signal in reduced time. This reduces the TTFF in the satellite navigation receiver 1707. The satellite navigation receiver 1707 comprises the communication interface 1708, a radio frequency down-converter 1709, an analog to digital converter (ADC) 1710, a correlator 1711, a data extraction module 1713, a time analysis module 1714, a navigation data processor 1715, and a position computation module 1716. The communication interface 1708 of the satellite navigation receiver 1707 receives the radio frequency navigation signal generated by the signal generation system 1701. The radio frequency down-converter 1709 converts the received radio frequency navigation signal to an intermediate frequency (IF) signal. The analog to digital converter 1710 converts the intermediate frequency signal to digital samples. The correlator 1711 correlates the digital samples of the navigation signal with locally generated signals, for example, reference digital samples. This enables data bit demodulation and further decoding of the navigation data structure 200.

The data extraction module 1713 defines instructions for extracting navigation data from the generated navigation data structure 200 contained in the navigation signal in reduced time. The data extraction module 1713 defines instructions for decoding the correlated digital samples received from the correlator 1711 to extract the navigation data from the navigation data structure 200. The position computation module 1716 defines instructions for processing the extracted navigation data for computing, for example, a geometric position of each satellite and estimating a geographical position of a user based on the processed navigation data in reduced time. The position computation module 1716 comprises a satellite position computation module 1716*a* and a user position computation module 1716*b*. The satellite position computation module 1716*a* defines instructions for processing the extracted navigation data for computing the position of the satellite based on the processed navigation data. The satellite position computation module 1716*a* further defines instructions for computing the geometric range and range-rate of each satellite. The user position computation module 1716*b* defines instructions for estimating a geographical position of a user, that is, latitude, longitude, altitude, etc., of the user, for example, by applying a standard global positioning system (GPS) based triangulation algorithm.

The time analysis module 1714 defines instructions for analyzing timing components that constitute the TTFF, and identifying timing delays at the satellite navigation receiver 1707. The timing components comprise a time for boot-up of the satellite navigation receiver 1707, a time for acquiring coarse estimates of a code phase and a carrier Doppler frequency of visible satellites of a constellation over satellite channels corresponding to the visible satellites, a time for performing bit synchronization of the satellite channels corresponding to the visible satellites, a time for extracting the navigation data from the generated navigation data structure 200 contained in the navigation signals received from the visible satellites by the satellite navigation receiver 1707, and a time for computing a geographical position of a user based on the extracted navigation data.

The navigation data processor 1715 retrieves the instructions defined by the data extraction module 1713, the time analysis module 1714, and the position computation module 1716 comprising the satellite position computation module 1716*a* and the user position computation module 1716*b*, and executes the instructions, thereby performing one or more processes defined by those instructions. Furthermore, the navigation data processor 1715 processes the extracted navigation data for computing the position of each satellite. The navigation data processor 1715 determines a geographical position of a user based on the processed navigation data in reduced time.

In an embodiment, the satellite navigation receiver 1707 further comprises a graphical user interface (GUI) 1712 for profiling navigation data measurements, the status of reception of the navigation data, health parameters of a satellite being tracked, etc. The GUI 1712, for example, displays individual satellite identifiers, acquisition and tracking status with reference to the collection of the navigation data, the constellation number, position coordinates of the satellite with reference to the earth-centered, earth-fixed (ECEF) coordinate system, a geographical position of a user, that is, the latitude, longitude, and altitude of the user, the time to first fix (TTFF), the geographical position of the user such as the latitude, longitude, and altitude of the user, etc.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A method for reducing time to first fix in a satellite navigation receiver, comprising:
generating a navigation data structure, by a navigation data generation module of a signal generation system, said generation of said navigation data structure comprising:
generating sub-frames of said navigation data structure, by a sub-frame generation module of said signal generation system, said sub-frames comprising:
a first sub-frame and a second sub-frame for accommodating ephemeris data of said navigation data; and
a third sub-frame for accommodating a text message comprising almanac data, ionospheric data, coordinated universal time data, user defined data, and any combination thereof;
grouping said almanac data, said ionospheric data, and said coordinated universal time data, by a data configuration module of said signal generation system;
processing said generated navigation data structure to generate a navigation signal, by a processing unit of said signal generation system; and
transmitting said generated navigation signal to said satellite navigation receiver, by a transmission module of said processing unit of said signal generation system, wherein said transmission of said generated navigational signal comprises transmitting said ephemeris data, said almanac data, said ionospheric data, said coordinated universal time data, and said user defined data in different combinations to said satellite navigation receiver, wherein said transmission further comprises alternatively transmitting said ionospheric data and said coordinated universal time data with said almanac data and without said almanac data in said third sub-frame in said generated navigation data structure, thereby reducing transmission time of said generated navigation signal to said satellite navigation receiver and reducing said time to first fix in said satellite navigation receiver.

2. The method of claim 1, wherein each of a plurality of satellites of a constellation is configured to simultaneously transmit said selective ephemeris data, said almanac data, said ionospheric data, said coordinated universal time data, and said user defined data in different combinations to said satellite navigation receiver, thereby allowing said satellite navigation receiver to collectively receive said ephemeris data, said almanac data, said ionospheric data, said coordinated universal time data, and said user defined data in said-different combinations, for further reducing said time to first fix in said satellite navigation receiver.

3. The method of claim 1, further comprising verifying integrity of said navigation data in said first sub-frame, said second sub-frame, and said third sub-frame of said generated navigation data structure, by a cyclic redundancy check module of said signal generation system, for determining accuracy of said navigation data.

4. The method of claim 1, wherein said text message in said third sub-frame of said generated navigation data structure further accommodates periodic non-positioning information extracted from said first sub-frame and said second sub-frame, wherein said periodic non-positioning information comprises telemetry data.

5. The method of claim 1, wherein each of said first sub-frame, said second sub-frame, and said third sub-frame of said generated navigation data structure comprises 288 bits of said navigation data and 6 bits of tail data.

6. The method of claim 1, wherein said generation of said navigation data structure comprises appending a synchronization word to each of said first sub-frame, said second sub-frame, and said third sub-frame, by said sub-frame generation module, wherein said synchronization word is configured to enable frame synchronization and identification of a sub-frame boundary of said each of said first sub-frame, said second sub-frame, and said third sub-frame.

7. The method of claim 1, further comprising receiving navigation signals comprising said navigation data in said generated navigation data structure from a plurality of satellites of a constellation by said satellite navigation receiver, wherein said satellite navigation receiver is configured to extract said navigation data from said received navigation signals by:
determining a sub-frame boundary of each of said first sub-frame, said second sub-frame, and said third sub-frame in said generated navigation data structure by searching for a synchronization word in said generated navigation data structure;
decoding said each of said first sub-frame, said second sub-frame, and said third sub-frame in said generated navigation data structure for extracting said navigation data;
performing a cyclic redundancy check operation on said extracted navigation data for validating said extracted navigation data; and
extracting said ephemeris data, said almanac data, said ionospheric data, said coordinated universal time data, and said user defined data from said validated navigation data based on a sub-frame identifier.

8. A method for reducing time to first fix in a satellite navigation receiver in a single frequency of operation, comprising:
generating a navigation data structure, by a navigation data generation module of a signal generation system, said generation of said navigation data structure comprising:
generating sub-frames of said navigation data structure, by a sub-frame generation module of said signal generation system, said sub-frames comprising:
a first sub-frame and a second sub-frame for accommodating ephemeris data of said navigation data; and
a third sub-frame for accommodating
a text message comprising ionospheric data and coordinated universal time data;
processing said generated navigation data structure to generate a navigation signal, by a processing unit of said signal generation system; and
transmitting said generated navigation signal to said satellite navigation receiver, by a transmission module of said processing unit of said signal generation system, wherein said transmission of said generated navigational signal comprises transmitting said ephemeris data, said ionospheric data, and said coordinated universal time data without almanac data to said satellite navigation receiver, wherein said ionospheric data and said coordinated universal time data are transmitted by one of a plurality of satellites of a constellation to said satellite navigation receiver, thereby reducing transmission time of said generated navigation signal to said satellite navigation receiver and reducing said time to first fix in said satellite navigation receiver.

9. The method of claim 8, further comprising determining a mode of operation for transmitting said navigation data in said generation navigation data structure, by a mode determination module of said processing unit, wherein said mode of operation is one of a civilian mode and a restricted mode.

10. The method of claim 8, further comprising altering transmission of said navigation data, by said transmission module, after said transmission of said ionospheric data and said coordinated universal time data for further reducing said time to first fix in said satellite navigation receiver.

11. A signal generation system implemented within each satellite for transmitting navigation data to a satellite navigation receiver, comprising:
  a navigation data generation module for generating a navigation data structure, comprising:
    a sub-frame generation module for generating sub-frames of said navigation data structure, said sub-frames configured to accommodate said navigation data, said sub-frames comprising:
      a first sub-frame and a second sub-frame for accommodating ephemeris data of said navigation data; and
      a third sub-frame for accommodating a text message comprising almanac data, ionospheric data, coordinated universal time data, user defined data, and any combination thereof;
    a data configuration module for configuring said navigation data in each of said sub-frames, wherein said data configuration module staggers said navigation data in said each of said sub-frames into a first portion and a second portion;
  a processing unit for processing said generated navigation data structure to generate a navigation signal;
  said processing unit further comprising a transmission module for transmitting said generated navigation signal to said satellite navigation receiver, wherein said transmission module parallelly transmits said each of said sub-frames comprising said staggered navigation data over a first carrier frequency and a second carrier frequency, wherein said first portion and said second portion of said each of said sub-frames are transmitted sequentially over said first carrier frequency and said second carrier frequency in a first mode of service, and wherein a complementary of said first portion and said second portion of said each of said sub-frames are transmitted sequentially over said second carrier frequency and said first carrier frequency in a second mode of service, thereby reducing transmission time of said generated navigation signal to said satellite navigation receiver and reducing a time to first fix in said satellite navigation receiver.

12. The system of claim 11, wherein said data configuration module sequentially sweeps said text message in said generated navigation data structure cyclically across satellites on each of said first carrier frequency and said second carrier frequency in one of said first mode of service and said second mode of service.

13. The system of claim 11, wherein said transmission module transmits said staggered navigation data on each of said first carrier frequency and said second carrier frequency.

14. The system of claim 11 wherein said data configuration module groups said almanac data, said ionospheric data, and said coordinated universal time data in different combinations for improving transmission time of said generated navigation signal to said satellite navigation receiver.

15. The system of claim 14, wherein said transmission module transmits said ephemeris data, said almanac data, said ionospheric data, said coordinated universal time data, and said user specified data in different combinations to said satellite navigation receiver for further reducing said transmission time of said generated navigation signal to said satellite navigation receiver.

16. The system of claim 11, wherein said transmission module alternatively transmits said ionospheric data and said coordinated universal time data with said almanac data and without said almanac data in said third sub-frame for further reducing transmission time of said generated navigation signal to said satellite navigation receiver.

17. The system of claim 11, wherein said transmission module simultaneously transmits said ephemeris data, said almanac data, said ionospheric data, said coordinated universal time data, and said user specified data different combinations to said satellite navigation receiver, thereby allowing said satellite navigation receiver to collectively receive said ephemeris data, said almanac data, said ionospheric data, said coordinated universal time data, and said user defined data in said different combinations, for further reducing said time to first fix in said satellite navigation receiver.

18. The system of claim 11, wherein said sub-frame generation module appends a synchronization word to each of said first sub-frame, said second sub-frame, and said third sub-frame, wherein said synchronization word is configured to enable frame synchronization and identification of a sub-frame boundary of said each of said first sub-frame, said second sub-frame, and said third sub-frame.

19. The system of claim 11, wherein said transmission module transmits said ephemeris data, said ionospheric data, and said coordinated universal time data without said almanac data to said satellite navigation receiver, wherein said ionospheric data and said coordinated universal time data are transmitted by one of a plurality of satellites of a constellation to said satellite navigation receiver.

20. The system of claim 11, wherein said transmission module is alters said transmission of said navigation data after said transmission of said ionospheric data and said coordinated universal time data for further reducing said time to first fix in said satellite navigation receiver.

21. A signal generation system implemented within each satellite for transmitting navigation data to a satellite navigation receiver, comprising:
  a navigation data generation module for generating a navigation data structure, comprising:
    a sub-frame generation module for generating sub-frames of said navigation data structure, said sub-frames configured to accommodate said navigation data, said sub-frames comprising:
      a first sub-frame and a second sub-frame for accommodating ephemeris data of said navigation data; and
      a third sub-frame for accommodating a text message comprising almanac data, ionospheric data, coordinated universal time data, user defined data, and any combination thereof;
    a data configuration module for configuring said navigation data in each of said sub-frames, wherein said data configuration module staggers said navigation data in said each of said sub-frames into a first portion and a second portion;
  a processing unit for processing said generated navigation data structure to generate a navigation signal;

said processing unit further comprising a transmission module for transmitting said generated navigation signal to said satellite navigation receiver, wherein said transmission module parallelly transmits said each of said sub-frames over a first carrier frequency and a second carrier frequency, wherein said parallel transmission of said each of said sub-frames comprises:

sequentially transmitting said first portion and said second portion of said each of said sub-frames over said first carrier frequency, and a complementary of said first portion and said second portion of said each of said sub-frames over said second carrier frequency in a first mode of service to obtain time of week data;

sequentially transmitting said second portion of one of said sub-frames and said first portion of another one of said sub-frames, and a complementary of said second portion of said one of said sub-frames and said first portion of said another one of said sub-frames over said first carrier frequency in a second mode of service; and sequentially transmitting said first portion of said one of said sub-frames and said second portion of said another one of said sub-frames, and a complementary of said first portion of said one of said sub-frames and said second portion of said another one of said sub-frames over said second carrier frequency in said second mode of service, wherein said second mode of service is assisted by said first mode of service for availing said obtained time of week data, thereby reducing transmission time of said generated navigation signal to said satellite navigation receiver and reducing said time to first fix in said satellite navigation receiver.

* * * * *